US009386475B2

(12) United States Patent
Liu et al.

(10) Patent No.: US 9,386,475 B2
(45) Date of Patent: *Jul. 5, 2016

(54) COEXISTENCE SUPPORT FOR MULTI-CHANNEL WIRELESS COMMUNICATIONS

(71) Applicant: Marvell World Trade Ltd., St. Michael (BB)

(72) Inventors: Yong Liu, Campbell, CA (US); Harish Ramamurthy, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 58 days.

This patent is subject to a terminal disclaimer.

(21) Appl. No.: 14/065,222

(22) Filed: Oct. 28, 2013

(65) Prior Publication Data
US 2014/0050093 A1     Feb. 20, 2014

Related U.S. Application Data

(63) Continuation of application No. 13/218,811, filed on Aug. 26, 2011, now Pat. No. 8,571,591.

(60) Provisional application No. 61/437,159, filed on Jan. 28, 2011, provisional application No. 61/393,791, filed on Oct. 15, 2010, provisional application No. 61/379,325, filed on Sep. 1, 2010.

(51) Int. Cl.
*H04W 28/02* (2009.01)
*H04W 72/02* (2009.01)
(Continued)

(52) U.S. Cl.
CPC .......... *H04W 28/0205* (2013.01); *H04W 72/02* (2013.01); *H04W 24/08* (2013.01); *H04W 48/12* (2013.01)

(58) Field of Classification Search
CPC ............... H04W 72/1252; H04W 28/0205; H04W 16/10
See application file for complete search history.

(56) References Cited

U.S. PATENT DOCUMENTS 5,515,366 A    5/1996  Chieu et al.
7,356,000 B2   4/2008  Oprescu-Surcobe et al.
(Continued)

OTHER PUBLICATIONS

"Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band," IEEE Std. 802.11g (2003), 69 pages.
(Continued)

*Primary Examiner* — Anh-Vu Ly
*Assistant Examiner* — Hector Reyes Ortiz

(57) ABSTRACT

Systems and techniques relating to wireless communications are described. A described technique includes monitoring a group of wireless channels for signals from one or more devices; identifying, within the group, one or more primary channels on which one or more signals are received from the one or more devices; and selecting, from the group of wireless channels, a primary channel for a wireless communication based on the one or more identified primary channels and an estimated traffic load associated with at least a portion of the group of wireless channels. The selecting can include using a first channel that is separate from the one or more identified primary channels as the selected primary channel when the estimated traffic load exceeds a threshold, and using a second channel from the one or more identified primary channels as the selected primary channel when the estimated traffic load does not exceed the threshold.

22 Claims, 15 Drawing Sheets

(51) Int. Cl.
*H04W 24/08* (2009.01)
*H04W 48/12* (2009.01)

(56) References Cited

U.S. PATENT DOCUMENTS

| | | | |
|---|---|---|---|
| 7,804,800 | B2 | 9/2010 | Li |
| 8,238,268 | B1 | 8/2012 | Shmidt |
| 8,379,757 | B1 | 2/2013 | Zhang |
| 2004/0203373 | A1 | 10/2004 | Ogino et al. |
| 2005/0026622 | A1 | 2/2005 | Georgeaux et al. |
| 2005/0175027 | A1 | 8/2005 | Miller et al. |
| 2005/0208956 | A1* | 9/2005 | Takagi et al. ......... 455/464 |
| 2005/0276252 | A1 | 12/2005 | Sizeland et al. |
| 2007/0042784 | A1 | 2/2007 | Anderson |
| 2007/0153754 | A1 | 7/2007 | Shapira et al. |
| 2007/0191008 | A1 | 8/2007 | Bucher et al. |
| 2008/0013480 | A1 | 1/2008 | Kapoor et al. |
| 2008/0151849 | A1* | 6/2008 | Utsunomiya et al. ......... 370/338 |
| 2008/0201733 | A1 | 8/2008 | Ertugrul et al. |
| 2009/0067403 | A1* | 3/2009 | Chan et al. ......... 370/343 |
| 2009/0280848 | A1 | 11/2009 | Park et al. |
| 2009/0310548 | A1* | 12/2009 | Kwon et al. ......... 370/329 |
| 2010/0159868 | A1 | 6/2010 | Seymour |
| 2010/0248635 | A1 | 9/2010 | Zhang et al. |
| 2010/0260138 | A1 | 10/2010 | Liu et al. |
| 2010/0272039 | A1 | 10/2010 | Um et al. |
| 2011/0038332 | A1 | 2/2011 | Liu et al. |
| 2011/0064117 | A1 | 3/2011 | Subramanian et al. |
| 2011/0096747 | A1* | 4/2011 | Seok ......... 370/329 |
| 2011/0116401 | A1* | 5/2011 | Banerjea et al. ......... 370/252 |
| 2011/0252238 | A1* | 10/2011 | Abuan et al. ......... 713/168 |
| 2011/0267948 | A1* | 11/2011 | Koc et al. ......... 370/235 |

OTHER PUBLICATIONS

"Part 11: Wireless LAN Medium Access Control (MAC) and Physical Layer (PHY) specifications: Higher-Speed Physical Layer Extension in the 2.4 GHz Band", IEEE Std 802.11a, 1999, 91 pages.

"Part II: Wireless LAN Medium Access Control (MAC) and Physical Layer (PHY) specifications: Higher-Speed Physical Layer Extension in the 2.4 GHz Band," IEEE Std. 802.11b (1999), 96 pages.

"TGn Sync Proposal Technical Specification", IEEE Std. 802.11n, 2005, 131 pages.

Cariou et al., "Multi-Channel Transmissions," 802.11 TGac, IEEE, 802.11-09/1022r0, Sep. 21, 2009, 13 pages.

Gunnam et al., Multi-Rate Layered Decoder Architecture for Block LDPC Codes of the IEEE 802.11n Wireless Standard, 2007, IEEE, STD, 4 pages.

Information technology—Telecommunications and information exchange between systems—Local and metropolitan networks—specific requirements. Part 11: Wireless LAN Medium Access Control (MAC) and Physical Layer (PHY) Specifications, IEEE Std. 802.11n, Oct. 29, 2009, 536 pages.

Liu et al., "Methods and Apparatus for Determining a Composite Channel," U.S. Appl. No. 13/034,409, filed Feb. 24, 2011, to be published by the USPTO, 64 pages.

Liu et al., "Signaling for Multi-Dimension Wireless Resource Allocation," U.S. Appl. No. 12/758,709, filed Apr. 12, 2010, to be published by the USPTO, 67 pages. U.S. Publication No. 2010-0260138.

Rosken, Wilfriend, Authorized Officer, European Patent Office, PCT International Application No. PCT/US2010/056619, in International Search Report mailed Mar. 2, 2011, 10 pages.

Supplement to Carrier Sense Multiple Access with Collision Detection (CSMA/CD) Access Method and Physical Layer Specifications—Frame Extensions for Virtual Bridged Local Area Network (VLAN) Tagging on 802.3 Networks, IEEE Std 802.3ac-1998, 19 pages.

Zhang et al., "Exploiting Multi-Antennas for Opportunistic Spectrum Sharing in Cognitive Radio Networks," IEEE the 18th Annual IEEE International Symposium on Personal, Indoor and Mobile Radio Communications (PIMRC), 2007, 5 pages.

Zhang et al., "Sounding and Steering Protocols for Wireless Communications," U.S. Appl. No. 12/750,636, filed Mar. 30, 2010, to be published by the USPTO, 64 pages. U.S. Publication No. 2010-0248635.

Kang, Byeongwoo et al., "Channel Selection and Management for 11ac", IEEE 802.11-10/0781r1, Jul. 14, 2010, pp. 4, 7-11, 14.

Noh, Yujin et al., "Channel Selection and Management for 11ac", IEEE 802.11-10/0593r1, May 20, 2010, pp. 2, 10, 12, 15-19.

Yoo, Byung Chul, International Search Report and Written Opinion of the International Searching Authority, PCT Application No. PCT/US2011/049462, Feb. 28, 2012, 9 pages.

\* cited by examiner

COEXISTENCE SUPPORT FOR MULTI-CHANNEL WIRELESS COMMUNICATIONS

CROSS REFERENCE TO RELATED APPLICATIONS

This present disclosure is a continuation of and claims the benefit of the priority of U.S. patent application Ser. No. 13/218,811, filed Aug. 26, 2011 and entitled "COEXISTENCE SUPPORT FOR MULTI-CHANNEL WIRELESS COMMUNICATIONS" (now U.S. Pat. No. 8,571,591), which claims the benefit of the priority of U.S. Provisional Application Ser. No. 61/379,325, filed Sep. 1, 2010 and entitled "VHT COEXISTENCE SUPPORT"; the benefit of the priority of U.S. Provisional Application Ser. No. 61/393, 791, filed Oct. 15, 2010 and entitled "VHT COEXISTENCE SUPPORT"; and the benefit of the priority of U.S. Provisional Application Ser. No. 61/437,159, filed Jan. 28, 2011 and entitled "VHT COEXISTENCE SUPPORT."

This disclosure is related to U.S. patent application Ser. No. 12/850,529, filed Aug. 4, 2010, and entitled "SDMA MULTI-DEVICE WIRELESS COMMUNICATIONS." This disclosure is related to U.S. patent application Ser. No. 13/034,409, filed Feb. 24, 2011, and entitled "METHODS AND APPARATUS FOR DETERMINING A COMPOSITE CHANNEL."

All of the applications identified above are incorporated herein by reference in their entirety.

BACKGROUND

This disclosure relates to wireless communication systems, including Wireless Local Area Networks (WLANs).

Wireless communication systems can include multiple wireless communication devices that communicate over one or more wireless channels. When operating in an infrastructure mode, a wireless communication device called an access point (AP) provides connectivity with a network, such as the Internet, to other wireless communication devices, e.g., client stations or access terminals (AT). Various examples of wireless communication devices include mobile phones, smart phones, wireless routers, and wireless hubs. In some cases, wireless communication electronics are integrated with data processing equipment such as laptops, personal digital assistants, and computers.

Wireless communication systems, such as WLANs, can use one or more wireless communication technologies, such as orthogonal frequency division multiplexing (OFDM). In an OFDM based wireless communication system, a data stream is split into multiple data substreams. Such data substreams are sent over different OFDM subcarriers, which are commonly also referred to as tones or frequency tones. WLANs such as those defined in the Institute of Electrical and Electronics Engineers (IEEE) wireless communications standards, e.g., IEEE 802.11a, IEEE 802.11n, or IEEE 802.11ac, can use OFDM to transmit and receive signals.

Wireless communication devices in a WLAN can use one or more protocols for a medium access control (MAC) layer and a physical (PHY) layer. For example, a wireless communication device can use a Carrier Sense Multiple Access (CSMA) with Collision Avoidance (CA) based protocol for a MAC layer and OFDM for the PHY layer.

Some wireless communication systems use a single-in-single-out (SISO) communication approach, where each wireless communication device uses a single antenna. Other wireless communication systems use a multiple-in-multiple-out (MIMO) communication approach, where a wireless communication device, for example, uses multiple transmit antennas and multiple receive antennas. A MIMO-based wireless communication device can transmit and receive multiple spatial streams over multiple antennas in each of the tones of an OFDM signal.

SUMMARY

The present disclosure includes systems and techniques for wireless communications.

According to an aspect of the present disclosure, a technique for wireless communications includes monitoring a group of wireless channels that are useable by at least a first wireless communication device for wireless communications, receiving one or more beacon signals from one or more second wireless communication devices, identifying, within the group of wireless channels, one or more primary channels on which the one or more beacon signals are received from the one or more second wireless communication devices, estimating a traffic load for the one or more identified primary channels, determining, based on the estimated traffic load, whether to use as a primary channel for the first wireless communication device a channel of the one or more identified primary channels or a channel of the group of wireless channels that is separate from the one or more identified primary channels, and selecting the primary channel for the first wireless communication device based on a result of the determining.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, one or more disclosed embodiments can be implemented in various systems and apparatus, including, but not limited to, a special purpose data processing apparatus (e.g., a wireless communication device such as a wireless access point, a remote environment monitor, a router, a switch, a computer system component, a medium access unit), a mobile data processing apparatus (e.g., a wireless client, a cellular telephone, a smart phone, a personal digital assistant (PDA), a mobile computer, a digital camera), a general purpose data processing apparatus such as a computer, or combinations of these.

An apparatus for wireless communications can include first circuitry configured to monitor a group of wireless channels that are useable by at least a first wireless communication device for wireless communications and to receive one or more beacon signals from one or more second wireless communication devices. The apparatus can include second circuitry configured to identify, within the group of wireless channels, one or more primary channels on which the one or more beacon signals are received from the one or more second wireless communication devices, estimate a traffic load for the one or more identified primary channels, and determine, based on the traffic load, whether to use as a primary channel for the first wireless communication device either a channel of the one or more identified primary channels or a channel of the group of wireless channels that is separate from the one or more identified primary channels.

A system for wireless communications can include transceiver electronics and processor electronics configured to perform operations. The operations can include monitoring a group of wireless channels that are useable by at least a first wireless communication device for wireless communications; receiving, via the transceiver electronics, one or more beacon signals from one or more second wireless communication devices; identifying, within the group of wireless channels, one or more primary channels on which the one or more beacon signals are received from the one or more second wireless communication devices; estimating a traffic load for the one or more identified primary channels; determining, based on the estimated traffic load, whether to use as a primary channel for the first wireless communication device a channel of the one or more identified primary channels or a channel of the group of wireless channels that is separate from the one or more identified primary channels; and selecting the primary channel for the first wireless communication device based on a result of the determining.

These and other implementations can include one or more of the following features. Selecting the primary channel for the first wireless communication device can include selecting, within the group of wireless channels, a channel that is separate from the one or more identified primary channels as the primary channel for the first wireless communication device based on the estimated traffic load exceeding a threshold. Selecting the primary channel for the first wireless communication device can include selecting the primary channel for the first wireless communication device from the one or more identified primary channels based on the estimated traffic load not exceeding the threshold.

Estimating the traffic load can include measuring one or more channel conditions of the one or more identified primary channels, and calculating one or more busy-to-idle ratios of the one or more identified primary channels based on the one or more channel conditions. Determining a primary channel for a device can include comparing the one or more busy-to-idle ratios with a threshold.

In some implementations, the group of wireless channels includes two frequency portions, each of the two frequency portions occupying a consecutive frequency band that is one half of a frequency band associated with the group of wireless channels. Selecting the primary channel for the first wireless communication device can include selecting a frequency portion of the two frequency portions to be the primary channel for the first wireless communication device, the frequency portion having a frequency band separate from one or more frequency bands of the one or more identified primary channels.

Details of one or more implementations are set forth in the accompanying drawings and the description below. Other features and advantages may be apparent from the description and drawings, and from the claims.

DRAWING DESCRIPTIONS

Like reference symbols in the various drawings indicate like elements.

DETAILED DESCRIPTION

This disclosure provides details and examples of technologies for wireless local area networks, including systems and techniques for coexistence support for multi-channel wireless communications. An example of a technique for multi-channel device wireless communications includes operating a wireless communication device to communicate in the presence of other wireless communication devices in a way that increases frequency utilization and promotes fairness among devices sharing a common wireless medium. Potential advantages include an increased utilization of primary and secondary channel frequency bands, backwards compatibility with older standards, or both. The techniques and architectures presented herein can be implemented in a variety of wireless communication systems, such as ones based on IEEE 802.11n or IEEE 802.11ac. One of more of the described systems and techniques can be combined with technology disclosed by U.S. patent application Ser. No. 12/850,529, filed Aug. 4, 2010, and entitled "SDMA MULTI-DEVICE WIRELESS COMMUNICATIONS."

Figure 1:
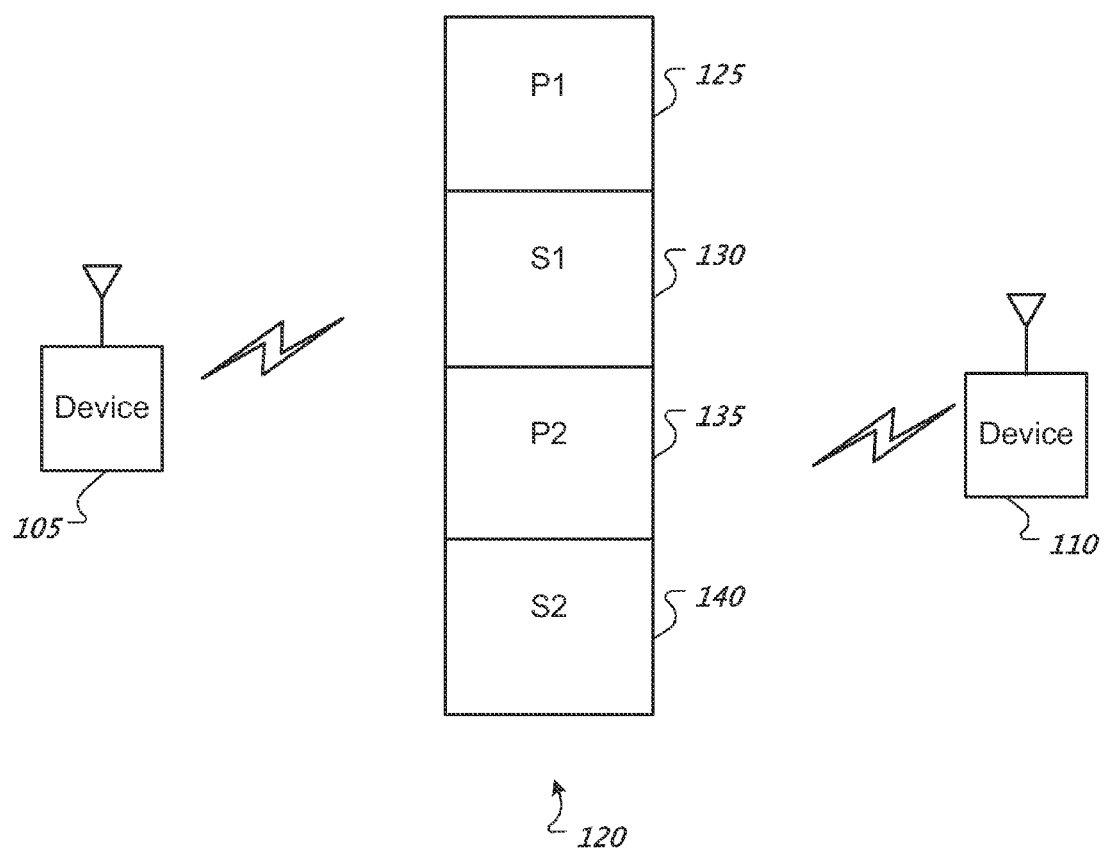
FIG. 1 shows an example of a channel structure for wireless communications.

FIG. 1 shows an example of a channel structure for wireless communications. Wireless communication devices 105, 110 can communicate over a group 120 of channels 125, 130, 135, 140. The group 120 can include 20 MHz wireless channel(s), 40 MHz wireless channel(s), 80 MHz wireless channel(s), or 160 MHz wireless channel(s). Other types of channels are possible. In some implementations, the channels 125, 130, 135, 140 are contiguous. In some implementations, one or more of the channels 125, 130, 135, 140 are noncontiguous with one or more of the other channels. A device 105, 110 such as an access point (AP), can provide a basic service set (BSS) for wireless communications. Based on monitoring the group 120 for activity from an existing BSS from a first AP 105, a newly activated device (e.g., a second AP 110) can select one or more channels in the group 120 to provide its own BSS.

In some implementations, the group 120 includes two primary channels 125, 135 (referred to as P1 and P2, respectively) and associated secondary channels 130, 140 (referred to as S1 and S2, respectively). A transmission on the P1 channel 125 sets a transmission protection period such as a network allocation vector (NAV) on channels associated with the group 120. An AP device 105 can communicate with different types of devices (e.g., devices based on different standards) such as a high-throughput (HT) device (e.g., IEEE 802.11n based device) and a very high-throughput (VHT) device (e.g., IEEE 802.11ac based device). A HT device is configured to use the P1 channel 125, the S1 channel 130, or a combination of these, whereas the VHT device is configured to use the P1 channel 125, the P2 channel 135, the S1 channel 130, the S2 channel 140, or a combination of two or more of these channels. The AP device 105 can concurrently transmit to the VHT device and the HT device.

In some cases, an AP device 105 transmits to the VHT device using a P2 channel 135 and transmits to the HT device using a P1 channel 125. The AP device 105 coordinates the transmission of one or more packets on the P1 and P2 channels 125, 135 such that they end at the same time to create a window for acknowledgements (ACKs). Moreover, an AP device 105 can use the P1 channel 125 and the S1 channel 130 to provide a 40 MHz wide transmission to a HT device and use the P2 channel 135 and the S2 channel 140 to provide a 40 MHz wide transmission to a VHT device. In some cases, the AP device 105 can use all of the channels of the group 120 to communicate with a single device.

An access point, such as AP device 105, can transmit packets to two devices for respective overlapping transmission periods. The two devices can implement different respective wireless communication standards (e.g., IEEE 802.11n or IEEE 802.11ac). For example, transmitting a first packet can include transmitting to a first wireless communication device that is configured for communications based on a first wireless communication standard (e.g., IEEE 802.11n), whereas, transmitting a second packet can include transmitting to a second wireless device that is configured for communications based on a second wireless communication standard (e.g., IEEE 802.11ac). Note that the first and the second wireless communication standards can define mutually compatible communications on the first channel, with the second standard defining communications for the first and second channels. In some cases, an access point can have overlapping transmissions to the same device using multiple channels. For example, transmitting first and second packets can include transmitting the packets concurrently to the same device.

Figure 2:
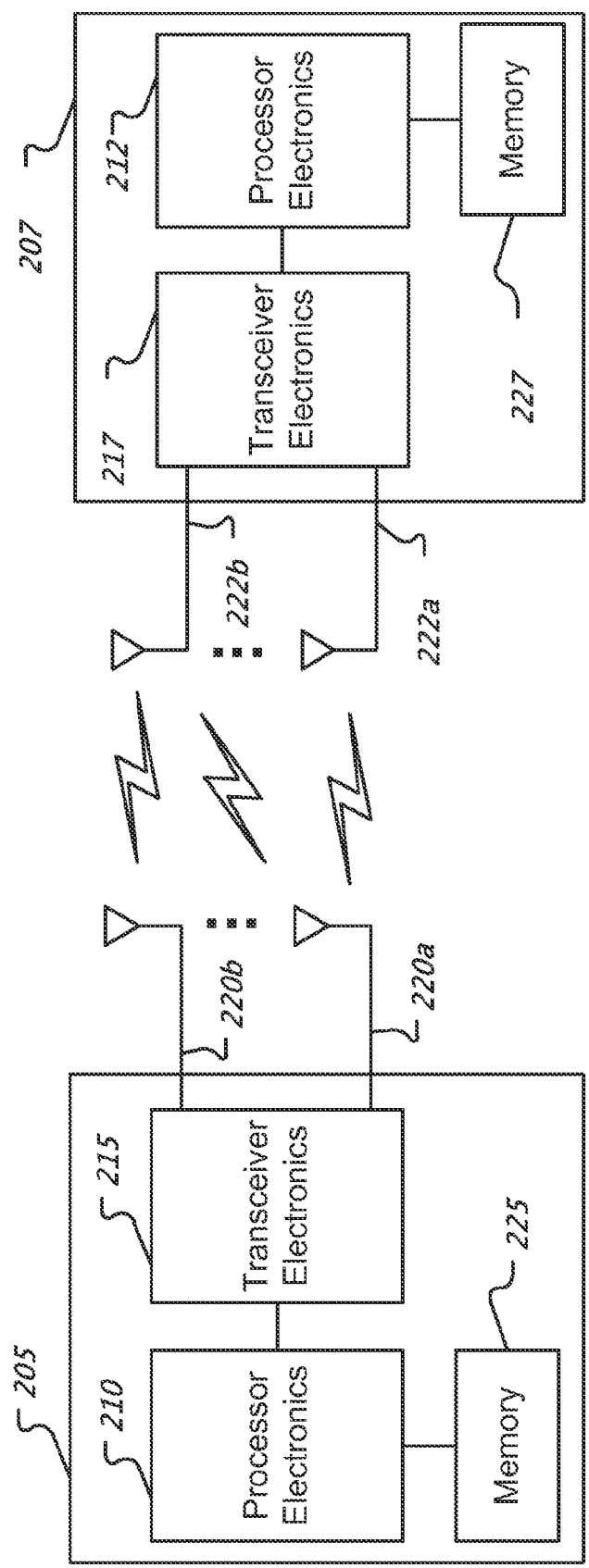
FIG. 2 shows an example of a wireless network with two wireless communication devices.

FIG. 2 shows an example of a wireless network with two wireless communication devices. Wireless communication devices 205, 207 such as an access point (AP), base station (BS), wireless headset, access terminal (AT), client station, or mobile station (MS) can include circuitry such as processor electronics 210, 212. Processor electronics 210, 212 can include one or more processors that implement one or more techniques presented in this disclosure. Wireless communication devices 205, 207 include circuitry such as transceiver electronics 215, 217 to send and receive wireless signals over one or more antennas 220a, 220b, 222a, 222b. In some implementations, transceiver electronics 215, 217 include integrated transmitting and receiving circuitry. In some implementations, transceiver electronics 215, 217 include multiple radio units. In some implementations, a radio unit includes a baseband unit (BBU) and a radio frequency unit (RFU) to transmit and receive signals. Transceiver electronics 215, 217 can include one or more of: detector, decoder, modulator, and encoder. Transceiver electronics 215, 217 can include one or more analog circuits. Wireless communication devices 205, 207 include one or more memories 225, 227 configured to store information such as data, instructions, or both. In some implementations, wireless communication devices 205, 207 include dedicated circuitry for transmitting and dedicated circuitry for receiving. In some implementations, a wireless communication device 205, 207 is operable to act as a serving device (e.g., an access point), or a client device.

In some implementations, a first wireless communication device 205 can transmit data to one or more devices via two or more spatial wireless communication channels such as orthogonal spatial subspaces, e.g., orthogonal Space Division Multiple Access (SDMA) subspaces. For example, the first wireless communication device 205 can concurrently transmit data to a second wireless communication device 207 using a spatial wireless channel and can transmit data to a third wireless communication device (not shown) using a different spatial wireless channel. In some implementations, the first wireless communication device 205 implements a space division technique to transmit data to two or more wireless communication devices using two or more spatial multiplexing matrices to provide spatially separated wireless channels in a single frequency band.

Wireless communication devices, such as a MIMO enabled access point, can transmit signals for multiple client wireless communication devices at the same time in the same frequency band by applying one or more transmitter side beam forming matrices to spatially separate signals associated with different client wireless communication devices. Based on different signal patterns at the different antennas of the wireless communication devices, each client wireless communication device can discern its own signal. A MIMO enabled access point can participate in sounding to obtain channel state information for each of the client wireless communication devices. The access point can compute spatial multiplexing matrices, such as spatial steering matrices, based on the different channel state information to spatially separate signals to different client devices.

Figure 3:
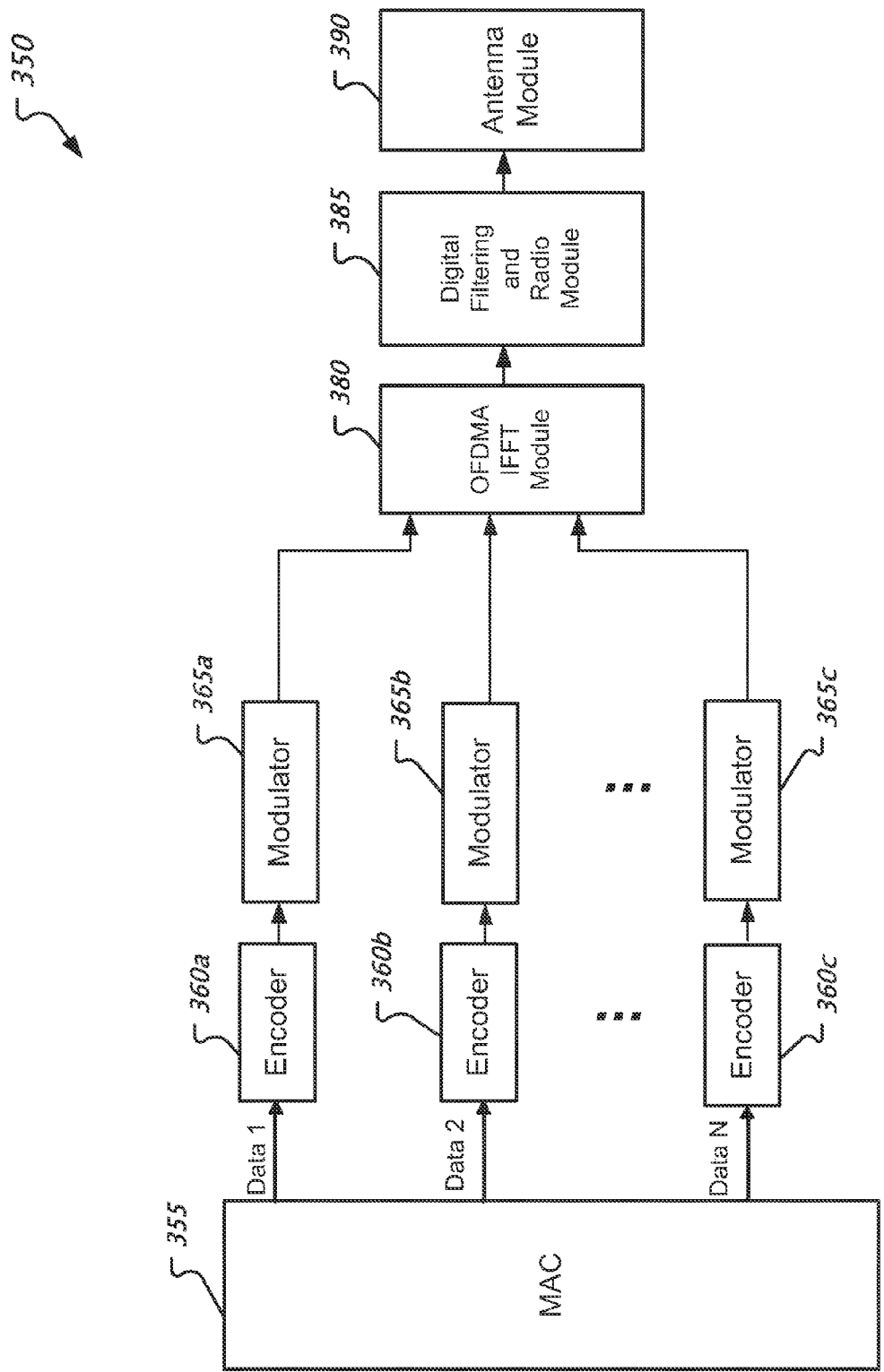
FIG. 3 shows an example of a wireless communication device architecture.

FIG. 3 shows an example of a wireless communication device architecture, which can be used in the various implementations described above. A wireless communication device 350 can produce signals for two or more clients in two or more frequency bands. Note that a channel can be associated with a frequency band. A frequency band can include a group of OFDM sub-carriers. The wireless communication device 350 includes a MAC module 355. The MAC module 355 can include one or more MAC control units (MCUs) (not shown). The wireless communication device 350 includes three or more encoders 360a, 360b, 360c that receive data streams, from the MAC module 355, which are associated with one or more clients (e.g., N clients, or N transmission streams to one or more clients). The encoders 360a, 360b, 360c can perform encoding, such as a forward error correction (FEC) encoding technique to produce respective encoded streams. Modulators 365a, 365b, 365c can perform modulation on respective encoded streams to produce modulated streams to an Orthogonal Frequency-Division Multiple Access (OFDMA) Inverse Fast Fourier Transform (IFFT) module 380.

The OFDMA IFFT (O-IFFT) module 380 can perform IFFTs on modulated streams from respective modulators 365a, 365b, 365c. In some implementations, the O-IFFT module 380 can include an OFDMA module and an IFFT module, where the OFDMA module maps different modulated streams to different subcarrier groups before IFFT processing. In some implementations, the O-IFFT module 380 can perform an IFFT on an output of the first modulator 365a to produce a first time domain signal associated with a first frequency band. The O-IFFT module 380 can perform an IFFT on an output of the second modulator 365b to produce a second time domain signal associated with a second frequency band. The O-IFFT module 380 can perform an IFFT on an output of the Nth modulator 365c to produce an Nth time domain signal associated with an Nth frequency band.

In some implementations, the O-IFFT module 380 can combine the frequency components, e.g., frequency band components, associated with the output of respective first modulators 365a, 365b, 365c. The O-IFFT module 380 can perform an IFFT on the combination to produce a time domain signal associated with the frequency bands. In some implementations, an O-IFFT module 380 is configured to use one or more FFT bandwidth frequencies, e.g., 20 MHz, 40 MHz, 80 MHz, and 160 MHz. In some implementations, the O-IFFT module 380 can perform different IFFTs.

A digital filtering and radio module 385 can filter the time domain signal and amplify the signal for transmission via an antenna module 390. An antenna module 390 can include multiple transmit antennas and multiple receive antennas. In some implementations, an antenna module 390 is a detachable unit that is external to a wireless communication device 350.

In some implementations, a wireless communication device 350 includes one or more integrated circuits (ICs). In some implementations, a MAC module 355 includes one or more ICs. In some implementations, a wireless communication device 350 includes an IC that implements the functionality of multiple units and/or modules such as a MAC module, MCU, BBU, or RFU. In some implementations, a wireless communication device 350 includes a host processor that provides a data stream to a MAC module 355 for transmission. In some implementations, a wireless communication device 350 includes a host processor that receives a data stream from the MAC module 355. In some implementations, a host processor includes a MAC module 355.

Figure 4:
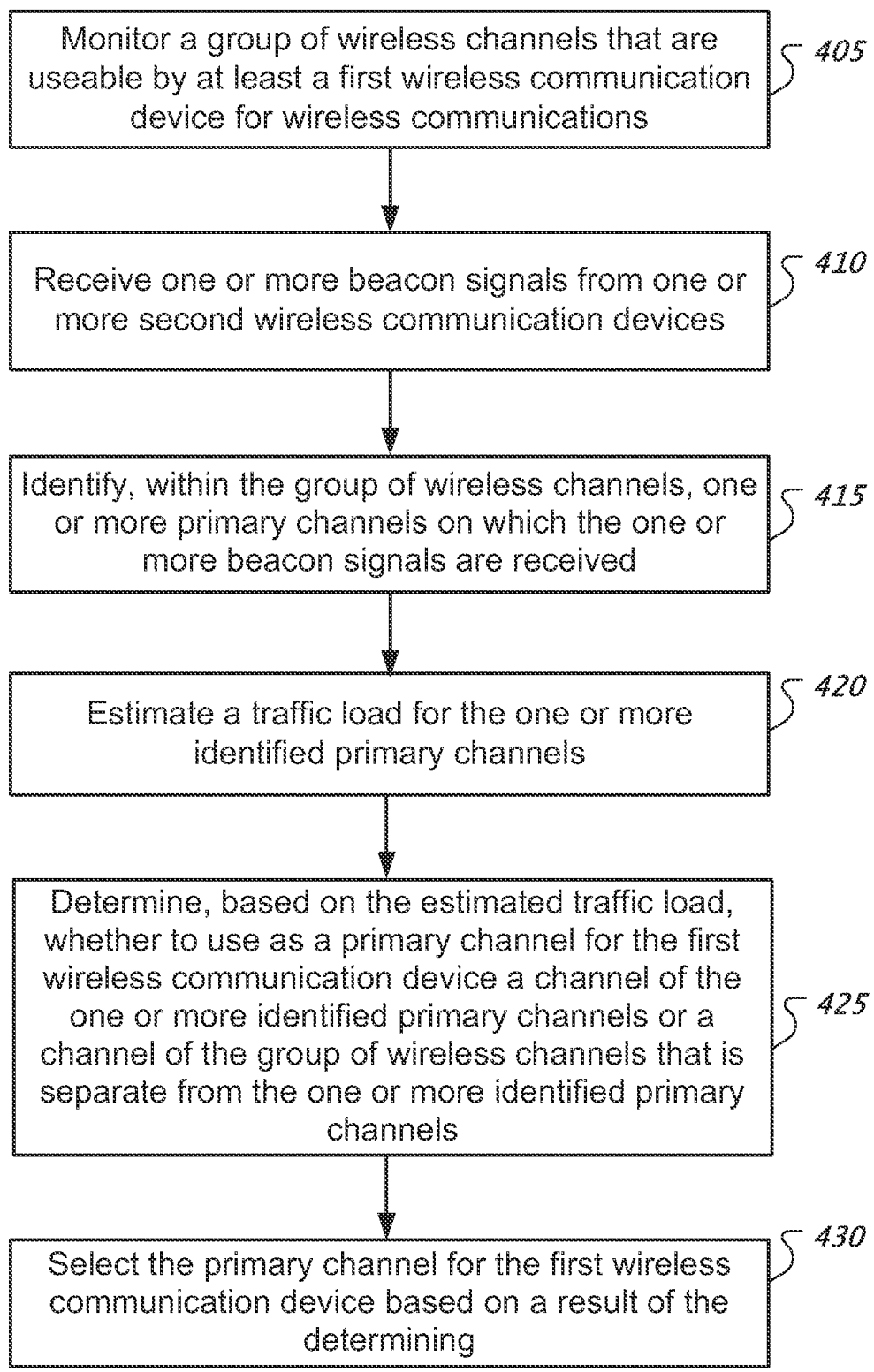
FIG. 4 shows an example of a communication process for multi-channel wireless communications.

FIG. 4 shows an example of a communication process for multi-channel wireless communications. At 405, a communication process monitors a group of wireless channels that are usable by at least a first wireless communication device for wireless communications. The first wireless communication device can be a VHT device (e.g., IEEE 802.11ac based device). The group of wireless channels can be in the 5 GHz band, including a 20 MHz primary channel (P), a 20 MHz secondary channel (S1), and a 40 MHz secondary channel (S2). In some implementations, the group of wireless channels can also include an 80 MHz secondary channel (S3) in addition to the P, S1 and S2. In some implementations, the combination of P and S1 can be a 40 MHz channel as defined in an IEEE 802.11n standard. The combination of P, S1 and S2 can be an 80 MHz channel including two adjacent 40 MHz channels as defined in an IEEE 802.11n standard. The S3 can also include two adjacent 40 MHz channels as defined in an IEEE 802.11n standard. When the frequency allocation of P is determined, the frequency allocations of other secondary channels in the group of wireless channels are also determined. In some implementations, for each 20 MHz sub-channel in the group of wireless channels, clear channel assessment technique can be used to monitor the group of wireless channels for channel conditions and/or traffic loads.

At 410, the communication process receives one or more beacon signals from one or more second wireless communication devices. The one or more second wireless communication devices can be devices such as HT devices (e.g., IEEE 802.11n based devices), VHT devices (e.g., IEEE 802.11ac based devices), or both.

At 415, the communication process identifies, within the group of wireless channels, one or more primary channels on which the one or more beacon signals are received. For example, the one or more primary channels can be one or more 20 MHz primary channels for one or more corresponding IEEE 802.11n basic service sets.

At 420, the communication process estimates a traffic load for the one or more identified primary channels. In some implementations, the traffic load can be estimated based on energy detection of the one or more identified primary channels. In some implementations, the communication process can also calculate a busy-to-idle ratio of the one or more identified primary channels, based on measuring channel conditions of the one or more identified primary channels. Then the communication process can determine, based on the calculated busy-to-idle ratio, a traffic threshold of the one or more identified primary channels.

At 425, the communication process determines, based on the estimated traffic load, whether to use as a primary channel for the first wireless communication device a channel of the one or more identified primary channels or a channel of the group of wireless channels that is separate from the one or more identified primary channels. The determining at 425 can include comparing the busy-to-idle ratio with a threshold to produce a comparison result.

At 430, the communication process selects the primary channel for the first wireless communication device based on a result of the determining at 425. Selecting the primary channel for the first wireless communication device can include selecting, within the group of wireless channels, a channel that is separate from the one or more identified primary channels as the primary channel for the first wireless communication device based on the estimated traffic load exceeding a threshold. Furthermore, selecting the primary channel for the first wireless communication device can include selecting the primary channel for the first wireless communication device from the one or more identified primary channels based on the estimated traffic load not exceeding the threshold.

In some implementations, the group of wireless channels includes two frequency portions; each of the two frequency portions occupies a consecutive frequency band that is one half of a frequency band associated with the group of wireless channels. Selecting the primary channel for the first wireless communication device can include selecting a frequency portion of the two frequency portions to be the primary channel for the first wireless communication device, the frequency portion having a frequency band separate from one or more frequency bands of the one or more identified primary channels.

In some cases, the one or more beacon signals are received from one second wireless communication device. Selecting the primary channel for the first wireless communication device can include selecting a channel on which the one or more beacon signals are received as the primary channel for the first wireless communication device, where the selected channel is a primary channel of a second communication device.

In some cases, at least a subset of the group of wireless channels does not overlap with wireless channels that are usable by the one or more second wireless communication devices. Selecting the primary channel for the first wireless communication device can include selecting a channel in the subset of the group of wireless channels as the primary channel for the first wireless communication device.

In some implementations, the one or more second wireless communication devices include a device that uses a 20 MHz primary channel, a 20 MHz secondary channel, and a 40 MHz secondary channel. Selecting the primary channel for the first wireless communication device can include selecting a channel in the 40 MHz secondary channel as the primary channel for the first wireless communication device.

In some implementations, the one or more second wireless communication devices include a device that uses a 20 MHz primary channel, a 20 MHz secondary channel, a 40 MHz secondary channel, and an 80 MHz secondary channel. Selecting the primary channel for the first wireless communication device can include selecting a channel in the 80 MHz secondary channel as the primary channel for the first wireless communication device.

In some implementations, when the one or more beacons are detected in a 20 MHz channel, the communication process can deem the 20 MHz channel as the identified primary channel for a second wireless communication device. The communication process can select the identified primary channel of the second wireless communication device as the primary channel for the first wireless communication device. For example, a VHT AP (e.g., the first wireless communication device), operable in the communication process, can start an 80 MHz or 160 MHz BSS (80/160 BSS) by selecting a primary channel that overlaps with an existing primary channel (e.g., the identified primary channel for the second wireless communication device). When the one or more beacons are detected in multiple 20 MHz channels (e.g., multiple primary channels are identified), the communication process can select a channel from the multiple identified primary channels as the primary channel for the first wireless communication device. For example, a VHT AP that is configured to perform the communication process can start an 80/160 BSS by selecting a primary channel that overlaps with one of the multiple existing primary channels that are being used by other devices. The VHT AP can further select a primary channel of the 80/160 BSS to overlap with the least busy channel of the existing primary channels. In some cases, the communication process can select a channel that does not overlap with the wireless channels used by the one or more second communication devices.

In some implementations, when there is an existing 80 MHz BSS, the communication process can select a 20 MHz channel in the S2 (e.g., a 40 MHz secondary channel) of the existing 80 MHz BSS as its primary channel. When there is an existing 160 MHz BSS, the communication process can select a 20 MHz channel in the S3 (e.g., an 80 MHz secondary channel) of the existing 160 MHz BSS as its primary channel. Additional examples of selecting the primary channel for the first wireless communication are described in connection with FIGS. 5-15 with respect to different BSS existence scenarios.

Figure 5:
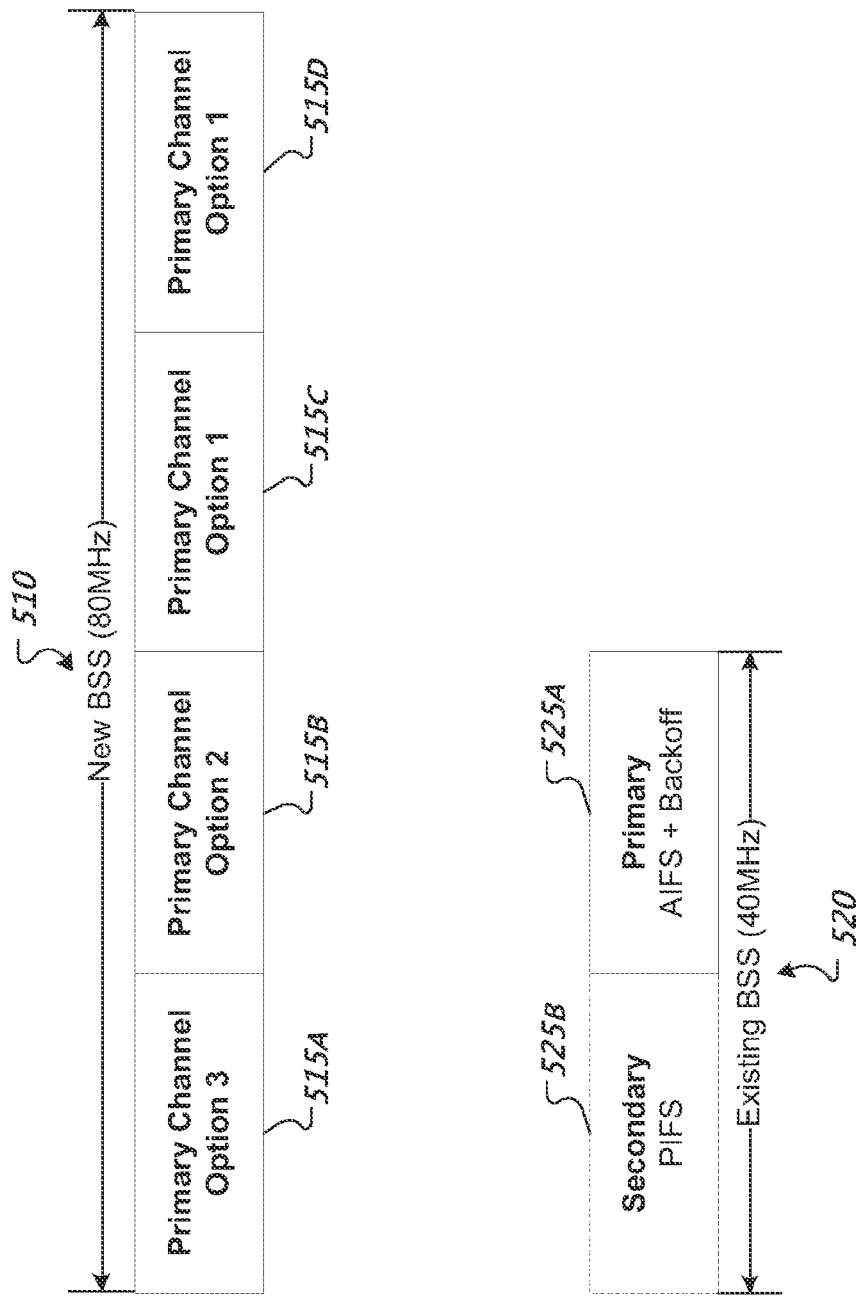
FIG. 5 shows an example of primary channel selection for a new basic service set (BSS) in a first BSS coexistence scenario.

FIG. 5 shows an example of primary channel selection for a new BSS in a first BSS coexistence scenario. There is an existing BSS 520 (e.g., an IEEE 802.11n based BSS) that uses a 40 MHz frequency band. The existing BSS 520 is provided by an existing device. Also, there is a new BSS 510 (e.g., an IEEE 802.11ac based BSS) 510 that uses an 80 MHz frequency band. The new BSS 510 is provided by a newly activated device (e.g., turned on, restarted, etc.). In this example, the new 80 MHz BSS 510 includes channels 515A, 515B that overlap with the 20 MHz primary channel 525A and the 20 MHz secondary channel 525B of the existing 40 MHz BSS 520.

The primary channel for the newly activated device can be selected such that the new BSS 510 has increased chances for obtaining a transmission opportunity (TXOP). To obtain a TXOP, a device such as an AP in the BSS can monitor one or more primary channels and one or more secondary channels for wireless traffic. If a primary channel has been idle for an Arbitration InterFrame Space (AIFS) plus a back-off duration, and one or more secondary channels have been idle for at least a Point coordination function InterFrame Space (PIFS) duration, the device can use the idle channels for the TXOP. Based on obtaining a TXOP, the device can send one or more frames continuously with a Short InterFrame Space (SIFS) duration gap between the frames.

The first option shown in FIG. 5 for primary channel selection for the new BSS 510 is as follows. The primary channel of the new BSS 510 can be selected from one of the channels 515C, 515D that do not overlap with the channels 525A, 525B used by the existing BSS 520. In some implementations, the primary channel of the new BSS 510 includes both of the channels 515C, 515D. The new BSS 510 can access channels 515C and 515D without contention from the existing BSS 520. The existing BSS 520 can access channels 525A and 525B most of the time, and it would experience some contention from the new BSS 510. The new BSS 510 can access channels 515A and 515B during a vulnerable period, which is a time period that includes the backoff time duration and/or a channel access delay (e.g., PIFS) of the existing BSS 520. When the idle starting time (or the backoff starting time) of the new BSS 510 falls into the vulnerable period, the new BSS 510 can use the channels 515A and 515B. In some implementations, When the vulnerable period is much less than the TXOP duration of the new BSS 510, the chance for the new BSS 510 to access the channels used by the existing BSS 520 channels can be low. With respect to the traffic loads of the channels, when both the new BSS 510 and the existing BSS 520 are fully loaded (e.g., experiencing a channel utilization rate of greater than 90%, other numerical values are possible), all the channels can be fully utilized. When the new BSS 510 is fully loaded and the existing BSS 520 is lightly loaded, the new BSS 510 can have sufficient usage of channels 515C and 515D, and can gain some usage of channels 515A, 515B, or both. When the new BSS 510 is lightly loaded and the existing BSS 520 is fully loaded, the new BSS 510 can avoid using channels 515A, 515B, or both.

The second option shown in FIG. 5 for primary channel selection for the new BSS 510 is as follows. The primary channel 515B of the new BSS 510 can be selected to overlap with the primary channel 525A of the existing BSS 520. Based on this option, the new BSS 510 can share the usage of 515B with the existing BSS 520, and the new BSS 510 can access channels 515C and 515D when it gains access to channel 515B. With respect to the traffic loads of the channels, when the new BSS 510 is fully loaded, it can gain access to channels 515C and 515D if the new BSS 510 has a TXOP. When the new BSS 510 is lightly loaded and the existing BSS 520 is fully loaded, the new BSS 510 can compete with the existing BSS 520 for accessing channel 515B.

The third option shown in FIG. 5 for primary channel selection for the new BSS 510 is as follows. The primary channel 515A of the new BSS 510 can be selected to overlap with the secondary channel 525B of the existing BSS 520. Based on this option, the new BSS 510 can share the usage of channel 515B with the existing BSS 520, and the new BSS 510 can access channels 515C and 515D when it gains access to channel 515B. With respect to the traffic loads of the channels, when both BSS's are fully loaded, the new BSS 510 can compete with the existing BSS 520 for accessing their primary channel. When the new BSS 510 is fully loaded and the existing BSS 520 is lightly loaded, the new BSS 510 can gain more access to channels 525A and 525B. In some implementations, if the new BSS 510 cannot access 515B, then it also cannot access channels 515C and 515D.

In some implementations, the new BSS 510 is fully loaded and the existing BSS is lightly loaded, the existing BSS may use the second option for primary channel selection. Otherwise, the new existing BSS 510 may use the first option for the primary channel selection. The primary channel selection can be changed by an AP of the new BSS 510 if the traffic conditions of the new BSS 510 and/or the existing BSS 520 change.

Figure 6:
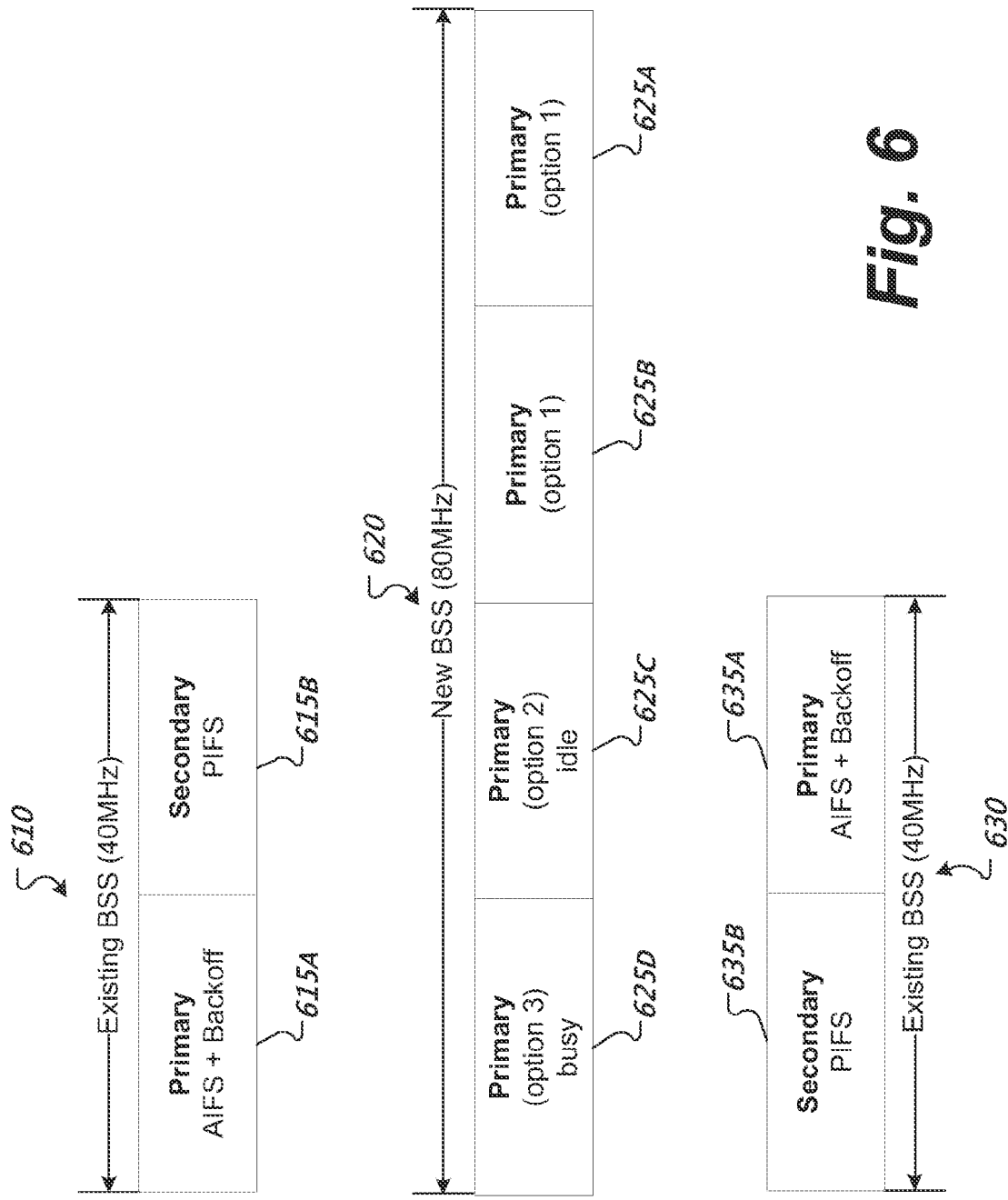
FIG. 6 shows an example of primary channel selection for a new BSS in a second BSS coexistence scenario.

FIG. 6 shows an example of primary channel selection for a new BSS in a second BSS coexistence scenario. There are two existing BSS's 610, 630 (e.g., IEEE 802.11n based BSS's), each use a 40 MHz frequency band. The existing BSS's 610, 630 are provided by existing devices. Also, there is a new BSS 620 (e.g., an IEEE 802.11ac based BSS) that uses an 80 MHz frequency band. In this example, the new BSS 620 (80 MHz) includes channels 625C, 625D that overlap with the primary channel 615A and the secondary channel 615B of the existing BSS 610. The channels 625C, 625D also overlap with the primary channel 635A and secondary channel 635B of the existing BSS 630. Furthermore, the primary channel 615A of the existing BSS 610 does not overlap with the primary channel 635A of the existing BSS 630.

The first option shown in FIG. 6 for primary channel selection for the new BSS 620 is as follows. The primary channel (625B or 625A) of the new BSS 620 can be selected from one of the channels 625A, 625B that do not overlap with the primary channels 615A, 635A and secondary channels 615B and 635B used by the existing BSS's 610, 630. Based on this option, the new BSS 620 can access channels 625A and 625B without contention from the existing BSS's 610, 630. The existing BSS's 610, 630 can access channels 625C and/or 625D most of the time, since they would experience some contention from the new BSS 620. With respect to the traffic loads of the channels, when all the BSS's are fully loaded, all the channels can be fully utilized. When the new BSS 620 is fully loaded, and both the existing BSS's are lightly loaded, the new BSS 620 can have sufficient usage of channels 625A and 625B, and can gain some usage of channels 625C and 625D. When the new BSS 620 is lightly loaded and the existing BSS's are fully loaded, the existing BSS's 610, 630 can have most of the usage of channels 625C and 625D.

The second option shown in FIG. 6 for primary channel selection for the new BSS 620 is as follows. The primary channel 625C of the new BSS 620 can be selected to overlap with the least busy existing primary channel between the primary channel 615A and the primary channel 635A. The new BSS 620 can share the usage of channel 625C with the least busy existing BSS. The new BSS 620 can access channels 625A and 625B when it gains access to channels 625C and 625D. With respect to the traffic loads of the channels, when all the BSS's are fully loaded, the new BSS 620 can share channel 625C with existing BSS's 610, 630. When the new BSS 620 is fully loaded and the existing BSS's 610, 630 are lightly loaded, the new BSS 620 can have most of the usage of channels 625C, and some usage of channels 625A, 625B, and 625D.

The third option shown in FIG. 6 for primary channel selection for the new BSS 620 is as follows. The primary channel 625D of the new BSS 620 can be selected to overlap with a busy existing BSS's primary channel.

In some implementations, for any traffic loads of the new BSS 620 and the existing BSS's 610, 630, the new BSS 620 can use the first option to select the primary channel. The third option may be chosen when the first and the second options are not available.

Figure 7:
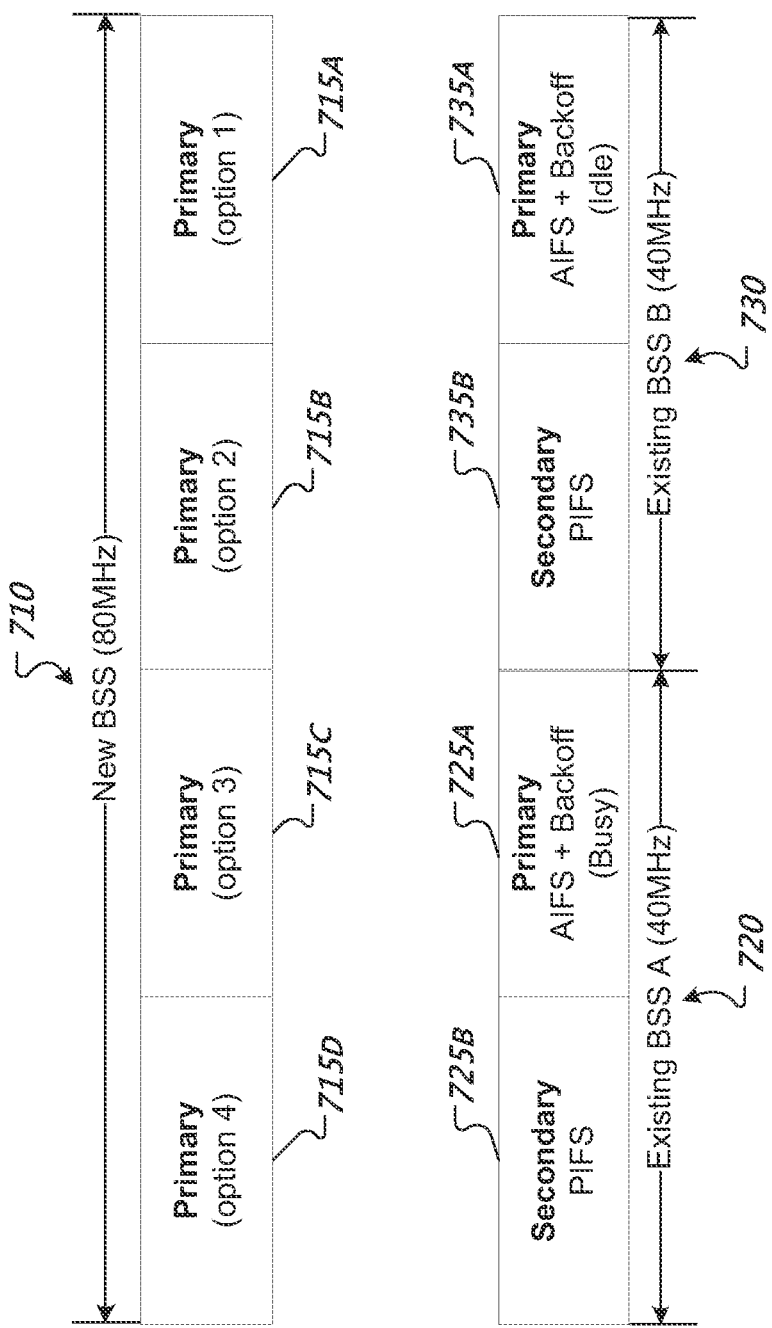
FIG. 7 shows an example of primary channel selection for a new BSS in a third BSS coexistence scenario.

FIG. 7 shows an example of primary channel selection in a third BSS coexistence scenario. There are two existing BSS's 720, 730 (e.g., IEEE 802.11n based BSS's), where each uses a 40 MHz frequency band. The existing BSS's 720, 730 are provided by existing devices. There is also a new BSS 710 (e.g., an IEEE 802.11ac based BSS) that uses an 80 MHz frequency band. The two 40 MHz frequency bands used by the two existing BSS's 720, 730 are adjacent to each other, and the concatenation of the two 40 MHz frequency band overlaps with the 80 MHz frequency band of the new BSS 710. The existing BSS A 720 uses a 20 MHz primary channel 725A and a 20 MHz secondary channel 725B, and the existing BSS B 730 uses a 20 MHz primary channel 735A and a 20 MHz secondary channel 735B. Furthermore, the primary channel 725A of the existing BSS A 720 is busier than the primary channel 735A of the existing BSS B 730. In other words, the traffic load on the primary channel 725A of existing BSS A 720 is higher than the traffic load on the primary channel 735A of existing BSS B 730.

The first option shown in FIG. 7 for primary channel selection for the new BSS 710 is as follows. The primary channel 715A of the new BSS 710 can be selected to overlap with the least busy primary channel 735A of existing BSS B 730. Based on option 1, the new BSS 710 can share 715A and 715B with a less busy BSS B 730 and get more usage of 715A and 715B.

The second option shown in FIG. 7 for primary channel selection for the new BSS 710 is as follows. The primary channel 715B of the new BSS 710 can be selected to overlap with secondary channel 735B associated with the least busy primary channel 735A. Based on this option, the new BSS 710 can get more usage of channel 715B and some usage of channel 715A.

The third option shown in FIG. 7 for primary channel selection for the new BSS 710 is as follows. The primary channel (715C or 715D) can be selected to overlap with a busy primary channel 725A of the existing BSS A 720. Based on this option, the new BSS 710 can share channels 715C and 715B with the busy existing BSS A 720 and can get a fair share of channels 715C and 715D. The new BSS 710 can also get some usage of channels 715A and 715B when it obtains 715A and 715B.

The fourth option shown in FIG. 7 for primary channel selection for the new BSS 710 is as follows. The primary channel of the new BSS 710 can be selected to overlap with the secondary channel 725B associated with the busy primary channel 725A of existing BSS A 720. Based on this option, the new BSS 710 can get most of the usage of channel 715D.

In some implementations, for any traffic loads of the new BSS 710 and the existing BSS's 720, 730, the new BSS 710 can use the first option to select the primary channel.

Figure 8:
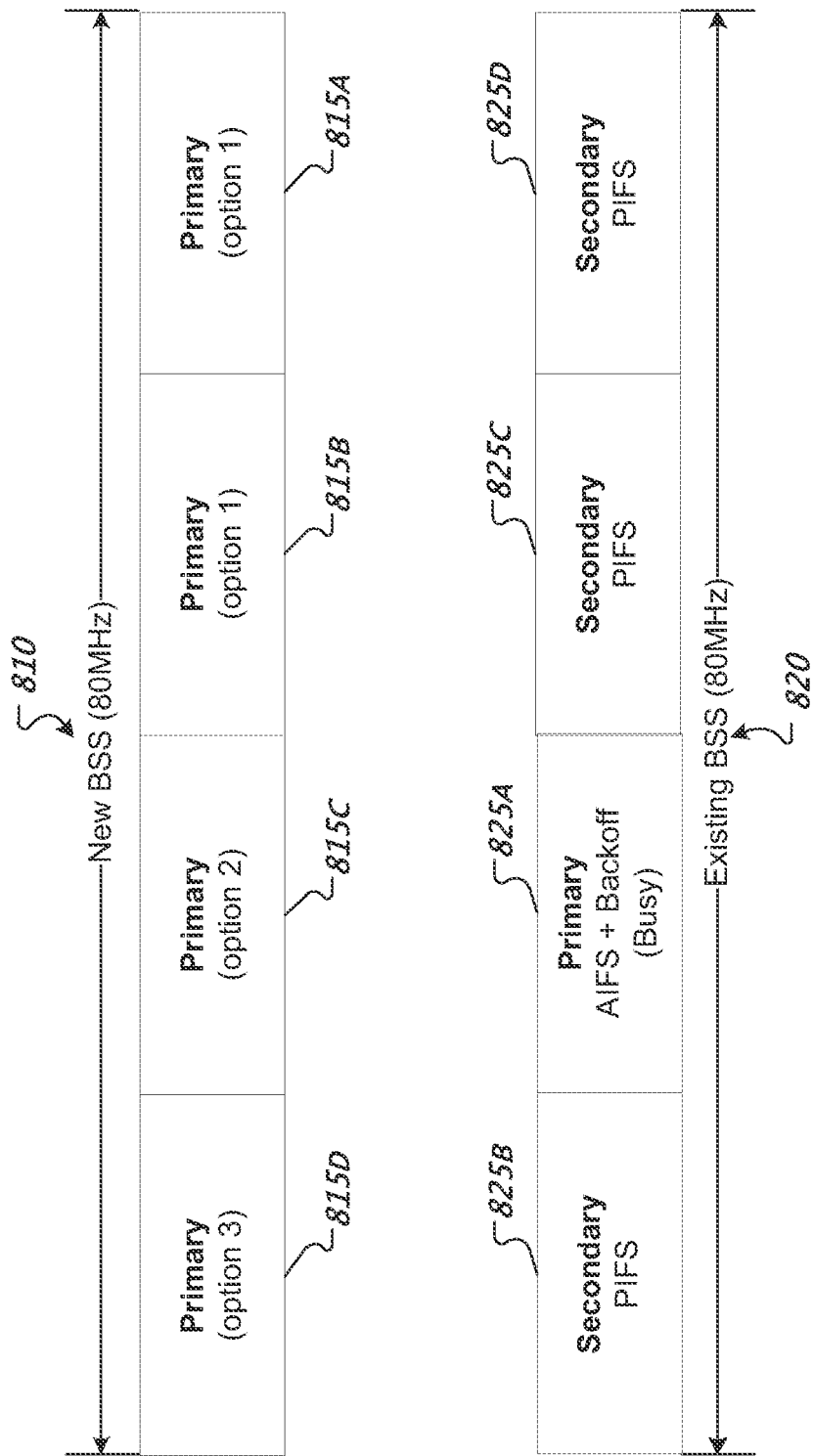
FIG. 8 shows an example of primary channel selection for a new BSS in a fourth BSS coexistence scenario.

FIG. 8 shows an example of primary channel selection in a fourth BSS coexistence scenario. There is an existing BSS 820 (e.g., an IEEE 802.11ac based BSS) that uses an 80 MHz frequency band. The existing BSS 820 is provided by an existing device. There is also a new BSS 810 (e.g., an IEEE 802.11ac based BSS) that uses an 80 MHz frequency band that overlaps with the 80 MHz frequency band of the existing BSS 820. The new BSS 810 is provided by a new device. In this example, the existing BSS includes a primary channel 825A that is busy, a first secondary channel 825B which can be referred to as S1, and a second secondary channel 825C (which can be referred to as S2), and a third secondary channel 825D (which can be referred to as S3).

The first option shown in FIG. 8 for primary channel selection for the new BSS 810 is as follows. The primary channel (channel 815A, channel 815B, or both) of the new BSS 810 can be selected to at least partially overlap with the S2 and S3 channels 825C, 825D of the existing BSS 820. Based on this option, the new BSS 810 can access channels 815A, 815B without contention from the existing BSS 820, and can access channels 815C, 815D most of the time with some contention from the exiting BSS 820. With respect to the traffic loads of the channels, when both BSS's 810, 820 are fully loaded, all the channels can be fully utilized. When the new BSS 810 is fully loaded and the existing BSS 820 is lightly loaded, the new BSS 810 can have sufficient usage of channels 815A and 815B, and can gain some usage of channels 815C and 815D. When the new BSS 810 is lightly loaded and the existing BSS 820 is fully loaded, the existing BSS 820 can have sufficient usage of channels 810C and 810D, and can gain some usage of channels 815A and 815B.

The second option shown in FIG. 8 for primary channel selection for the new BSS 810 is as follows. The primary channel 815C of the new BSS 810 can be selected to overlap with the primary channel 825A of the existing BSS 820. Based on this option, the new BSS 810 can share the usage of channel 815C with the existing BSS 820. The new BSS 810 can access channels 815A and 815B when it gains access to channels 815C and 815D. With respect to the traffic loads of the channels, when both BSS's are fully loaded, channels 815A and 815B can be fully utilized. When the new BSS 810 is fully loaded and the existing BSS 820 is lightly loaded, all the channels can be sufficiently used. When the new BSS 810 is lightly loaded and the existing BSS 820 is fully loaded, all the channels can be sufficiently used.

The third option shown in FIG. 8 for primary channel selection for the new BSS 810 is as follows. The primary channel 815D of the new BSS 810 can be selected to overlap with secondary channel 825B of the existing BSS 820. Based on this option, the existing BSS 820 can access channel 815C most of the time with some contention from the new BSS 810. The new BSS 810 can access channel 815D most of the time with some contention from the existing BSS 820. One of the BSS's 810, 820 can access all the channels when it can access the other BSS's primary channel. When both BSS's are fully loaded, the new BSS 810 can have sufficient usage of channel 815D, and the existing BSS 820 can have sufficient usage of channel 815C. When the new BSS 810 is fully loaded and the existing BSS 820 is lightly loaded, the new BSS 810 can gain some access of channels 815A-C. When the new BSS 810 is lightly loaded and the existing BSS 820 is fully loaded, the existing BSS 820 can gain some access of channel 815D.

In some implementations, when both BSS's are fully loaded, the new BSS 810 can use the first to select primary channel. Otherwise, the new BSS 810 can use the second option to select primary channel.

Figure 9:
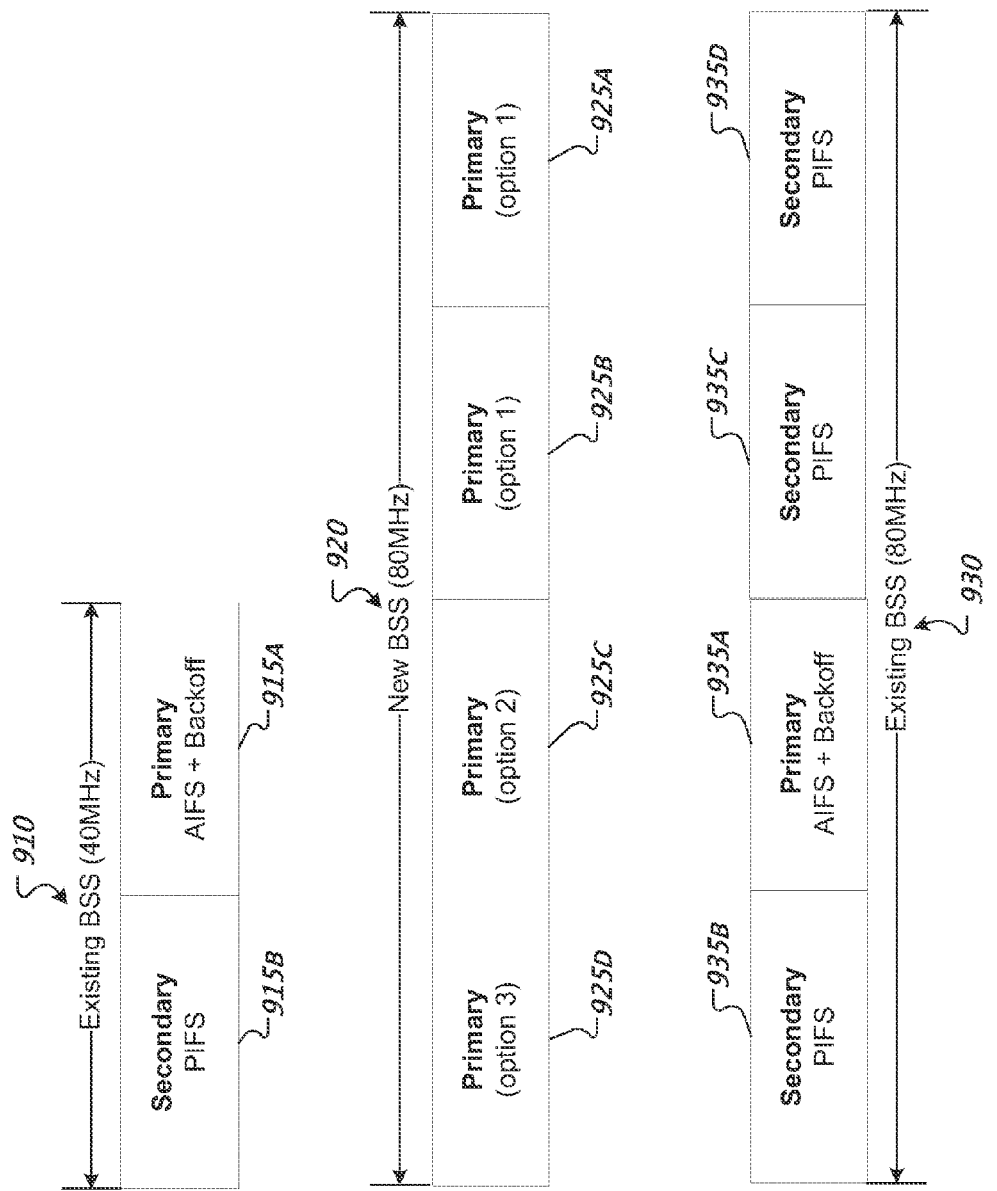
FIG. 9 shows an example of primary channel selection for a new BSS in a fifth BSS coexistence scenario.

FIG. 9 shows an example of primary channel selection for a new BSS in a fifth BSS coexistence scenario. There is an existing BSS 910 (e.g., an IEEE 802.11n based BSS) that uses a 40 MHz frequency band, and an existing BSS 930 (e.g., IEEE 802.11ac based BSS) 930 that uses an 80 MHz frequency band. The existing BSS's 910, 930 are provided by existing devices. There is also a new BSS 920 (e.g., an IEEE 802.11ac based BSS) that uses an 80 MHz frequency band. The new BSS 920 is provided by a new device. The frequency band of the existing BSS 930 (80 MHz) overlaps with the frequency band used by the new BSS 920. The frequency band of the existing BSS 910 (40 MHz) partially overlaps with the new BSS 920 and the existing BSS 930 (80 MHz). Furthermore, the primary channel 915A of the existing BSS 910 (40 MHz) overlaps with the primary channel 935A of the existing BSS 930 (80 MHz).

The first option shown in FIG. 9 for primary channel selection for the new BSS 920 is as follows. The primary channel (925A or 925B) of the new BSS can be selected to partially overlap with S2 (935C and 935D) of the existing BSS 930. Based on this option, the new BSS 920 can access 925A and 925B without any contention from both existing BSS's 910, 930. The existing BSS's 910, 930 can access 925C and 925D most of the time with some contention from the new BSS 920. With respect to the traffic loads of the channels, when both BSS's are fully loaded, all the channels can be fully utilized, when the new BSS 920 is fully loaded and the existing BSS's 910, 930 are lightly loaded, the new BSS 920 can make sufficient usage of channels 925A and 925B, and can gain some usage of channels 925C and 925D. When the new BSS 920 is lightly loaded and the existing BSS's 910, 930 are fully loaded, the existing BSS's 910, 930 can make sufficient usage of channels 925C and 925D, and can gain some usage of channels 925A and 925B

The second option shown in FIG. 9 for primary channel selection for the new BSS 920 is as follows. The primary channel 925C of the new BSS 920 can be selected to overlap with the primary channels 915A, 935A of the existing BSS's 910, 930, respectively. Based on this option, the new BSS 920 can share the usage of channel 925C with the existing BSS's 910, 930. The new BSS 920 can access channels 925A and 925B when it gains access to channels 925C and 925D. With respect to the traffic loads of the channels, when the new BSS 920 is fully loaded and the existing BSS's 910, 930 are lightly loaded, all the channels can be sufficiently used. When the new BSS 920 is lightly loaded and the existing BSS's 910, 930 are fully loaded, all the channels can be sufficiently used.

The third option shown in FIG. 9 for primary channel selection for the new BSS 920 is as follows. The primary channel 925D of the new BSS 920 can be selected to overlap with the secondary channels 915B, 935B of the respective existing BSS's 910, 930.

In some implementations, when both existing BSS's 910, 930 are fully loaded, the new BSS 920 can select its primary channel according to the first option. Otherwise, the new BSS 920 can select its primary channel according to the second option. The third option can be chosen when the first and the second options are not available.

Figure 10:
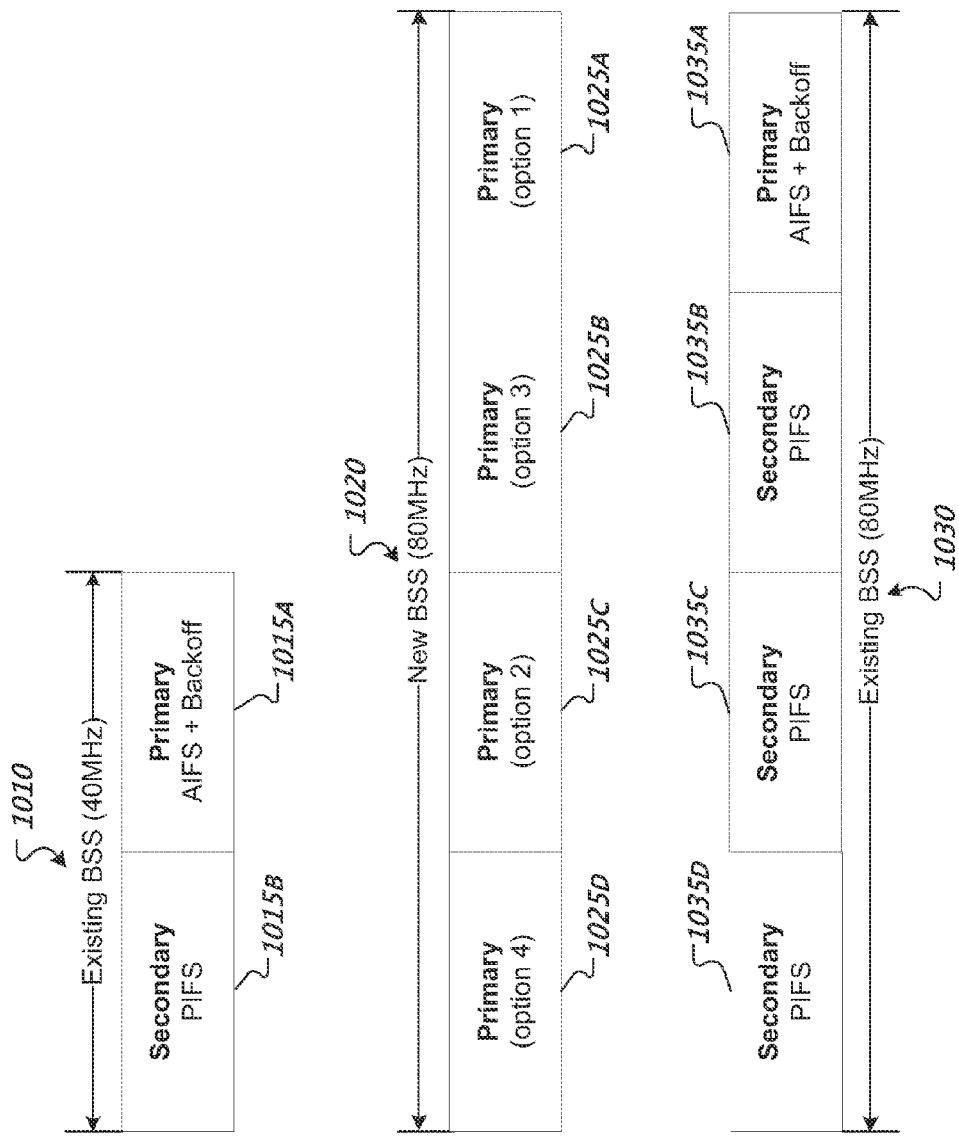
FIG. 10 shows an example of primary channel selection for a new BSS in a sixth BSS coexistence scenario.

FIG. 10 shows an example of primary channel selection for a new BSS in a sixth BSS coexistence scenario. There is a first existing BSS 1010 (e.g., an IEEE 802.11n based BSS) that uses a 40 MHz frequency band. Also, there is second existing BSS 1030 (e.g., IEEE 802.11ac based BSS) that uses an 80 MHz frequency band. The existing BSS's 1010, 1030 are provided by existing devices. There is a new BSS 1020 (e.g., an IEEE 802.11ac based BSS) that uses an 80 MHz frequency band. The frequency band of the existing BSS 1030 (80 MHz) overlaps with the frequency band of the new BSS 1020. The frequency band of the existing BSS 1010 (40 MHz) partially overlaps with the new BSS 1020 and the existing BSS 1030 (80 MHz). The primary channel 1015A of the existing BSS 1010 (40 MHz) and the primary channel 1035A of the existing BSS 1030 (80 MHz) are located separately in two different 40 MHz portions.

The first option shown in FIG. 10 for primary channel selection for the new BSS 1020 is as follows. The primary channel 1025A of the new BSS 1020 can be selected to overlap with the primary channel 1035A of the existing 80 MHz BSS 1030. Based on this option, the new BSS 1020 can share channels 1025A and 1025B with the existing 80 MHz BSS 1030. With respect to the traffic loads of the channels, when all the BSS's are fully loaded, all the channels can be sufficiently utilized. The existing 40 MHz BSS 1010 can make sufficient use of channels 1025C and 1025D. The two 80 MHz BSS's 1020, 1030 can share channels 1025A and 1025B. When the new BSS 1020 is fully loaded and the existing BSS's 1010, 1030 are lightly loaded, the new BSS 1020 can have most of the usage of channels 1025A and 1025B with some contention from existing BSS's 1010, 1030, and can gain some usage of channels 1025C and 1025D. When the new BSS 1020 is lightly loaded, and the existing BSS's 1010, 1030 are fully loaded, the existing 40 MHz BSS 1010 can have sufficient usage of channels 1025C and 1025D, and the existing 80 MHz BSS 1030 can gain some usage of channels 1025A and 1025B The second option shown in FIG. 10 for primary channel selection for the new BSS 1020 is as follows. The primary channel 1025C of the new BSS 1020 can be selected to overlap with the primary channel 1015A of the 40 MHz existing BSS 1010. Based on this option, the new BSS 1020 can share channels 1025C and 1025D with the 40 MHz existing BSS 1010. With respect to the traffic loads of the channels, when all the BSS's are fully loaded, the 80 MHz existing BSS 1030 can sufficiently use channels 1025A and 1025B, and the new BSS 1020 can share channels 1025C and 1025D with the 40 MHz BSS 1010. When the new BSS 1020 is fully loaded and existing BSS's 1010, 1030 are lightly loaded, the new BSS 1020 can gain most of the usage of channels 1025C and 1025D with some contention from the existing BSS's 1010, 1030. The new BSS 1020 can gain some usage of channels 1025A and 1025B. When the new BSS 1020 is lightly loaded, and the existing BSS's 1010, 1030 are fully loaded, the existing 40 MHz BSS 1010 can have sufficient usage of its channels 1015A, 1015B.

The third option shown in FIG. 10 for primary channel selection for the new BSS 1020 is as follows. The primary channel 1025B of the new BSS 1020 can be selected to overlap with secondary channel 1035B of the existing 80 MHz BSS 1030.

The fourth option shown in FIG. 10 for primary channel selection for the new BSS 1020 is as follows. The primary channel 1025D of the new BSS 1020 can be selected to overlap with secondary channel 1015B of the 40 MHz existing BSS 1010 and the secondary channel 1035D of the existing 80 MHz BSS 1030. The secondary channel 1035 is a 20 MHz portion of S2 1035C, 1035D of the existing 80 MHz BSS 1030.

In some implementations, the new BSS 1020 can select its primary channel according to the first option if the traffic load of the 40 MHz existing BSS 1010 is heavier than the existing 80 MHz existing BSS 1030. Otherwise, the new BSS 1020 can select its primary channel according to the second option. The new BSS 1020 can select its primary channel according to the third and fourth options when the first and the second options are not available.

Figure 11:
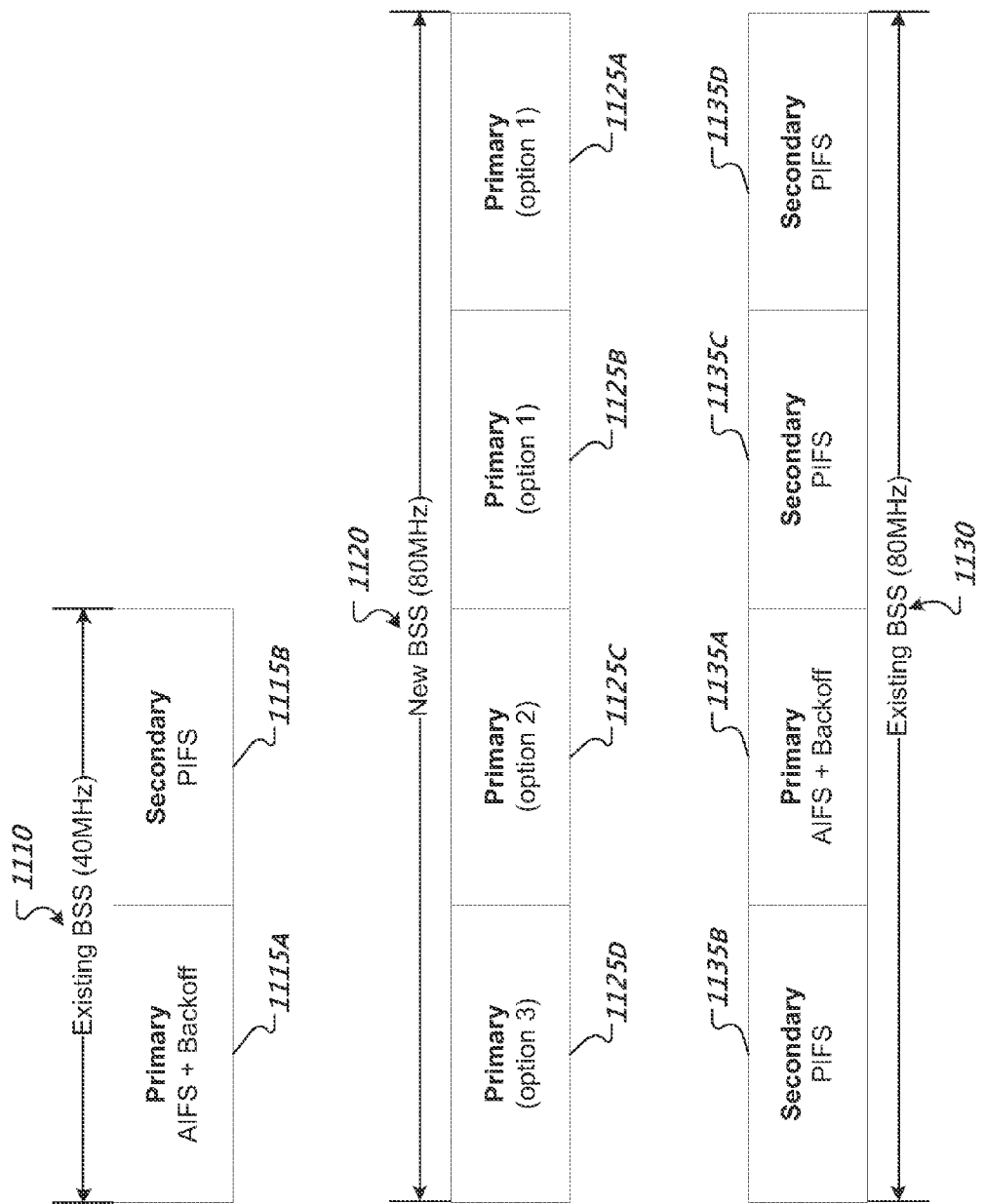
FIG. 11 shows an example of primary channel selection for a new BSS in a seventh BSS coexistence scenario.

FIG. 11 shows an example of primary channel selection for a new BSS in a seventh BSS coexistence scenario. There is an existing BSS 1110 (e.g., an IEEE 802.11n based BSS) that uses a 40 MHz frequency band, and an existing BSS 1130 (e.g., IEEE 802.11ac based BSS) that uses an 80 MHz frequency band. The existing BSS's 1110, 1130 are provided by existing devices. There is also a new BSS 1120 (e.g., an IEEE 802.11ac based BSS) that uses an 80 MHz frequency band. The frequency band of the existing BSS 1130 (80 MHz) overlaps with the frequency band of the new BSS 1120. The frequency band of the existing BSS 1110 (40 MHz) partially overlaps with the new BSS 1120 and the existing BSS 1130 (80 MHz). The primary channel 1115A of the existing BSS 1110 (40 MHz) and the primary channel 1035A of the existing BSS 1130 (80 MHz) are located in a same 40 MHz portion, but do not overlap with each other.

The first option shown in FIG. 11 for primary channel selection for the new BSS 1120 is as follows. The primary channel (channel 1125A or channel 1125B) of the new BSS 1120 can be selected to overlap with one or both of the secondary channels 1135C, 1135D of the existing BSS 1130. Based on this option, the new BSS 1120 can access channels 1125A and 1125B without contention from the existing BSS's 1110, 1130. The existing BSS's 1110, 1130 can access the frequency band associated with channels 1125C, 1125D most of the time. With respect to the traffic loads of the channels, when all the BSS's 1110, 1120, 1130 are fully loaded, all the channels can be sufficiently utilized. When the new BSS 1120 is fully loaded and the existing BSS's 1110, 1130 are lightly loaded, the new BSS 1120 can sufficiently use channels 1125A and 1125B, and can gain some usage of channels 1125C and 1125D. When the new BSS 1120 is lightly loaded and the existing BSS's 1110, 1130 are fully loaded, the existing BSS's 1110, 1130 can sufficiently use their channels that overlap with channels 1125C and 1125D of the new BSS 1120.

The second option shown in FIG. 11 for primary channel selection for the new BSS 1120 is as follows. The primary channel 1125C of the new BSS 1120 can be selected to overlap with the primary channel 1135A of the 80 MHz existing BSS 1130 and S1 1115 of the 40 MHz existing BSS 1110. Based on this option, the new BSS 1120 can share the usage of channel 1125C with the 80 MHz BSS 1130. The new BSS 1120 can access channels 1125A and 1125B when it gains access to channels 1125C and 1125D. With respect to the traffic loads of the channels, when all the BSS's are fully loaded, the new BSS 1120 can share channel 1125C with the 80 MHz BSS 1130. When the new BSS 1120 is fully loaded and existing BSS's 1110, 1130 are lightly loaded, the new BSS 1120 can gain most of the usage of channel 1125C with some contention from the existing BSS's 1110, 1130, and some usage of channels 1125A, 1125B, and 1125D.

The third option shown in FIG. 11 for primary channel selection for the new BSS 1120 is as follows. The primary channel 1125D of the new BSS 1120 can be selected to overlap with the primary channel 1115A of the 40 MHz existing BSS 1110 and S1 secondary channel 1135B of the existing 80 MHz BSS 1130.

In some implementations, the new BSS 1120 can select its primary channel according to the first option regardless of the traffic loads of the BSS's.

Figure 12:
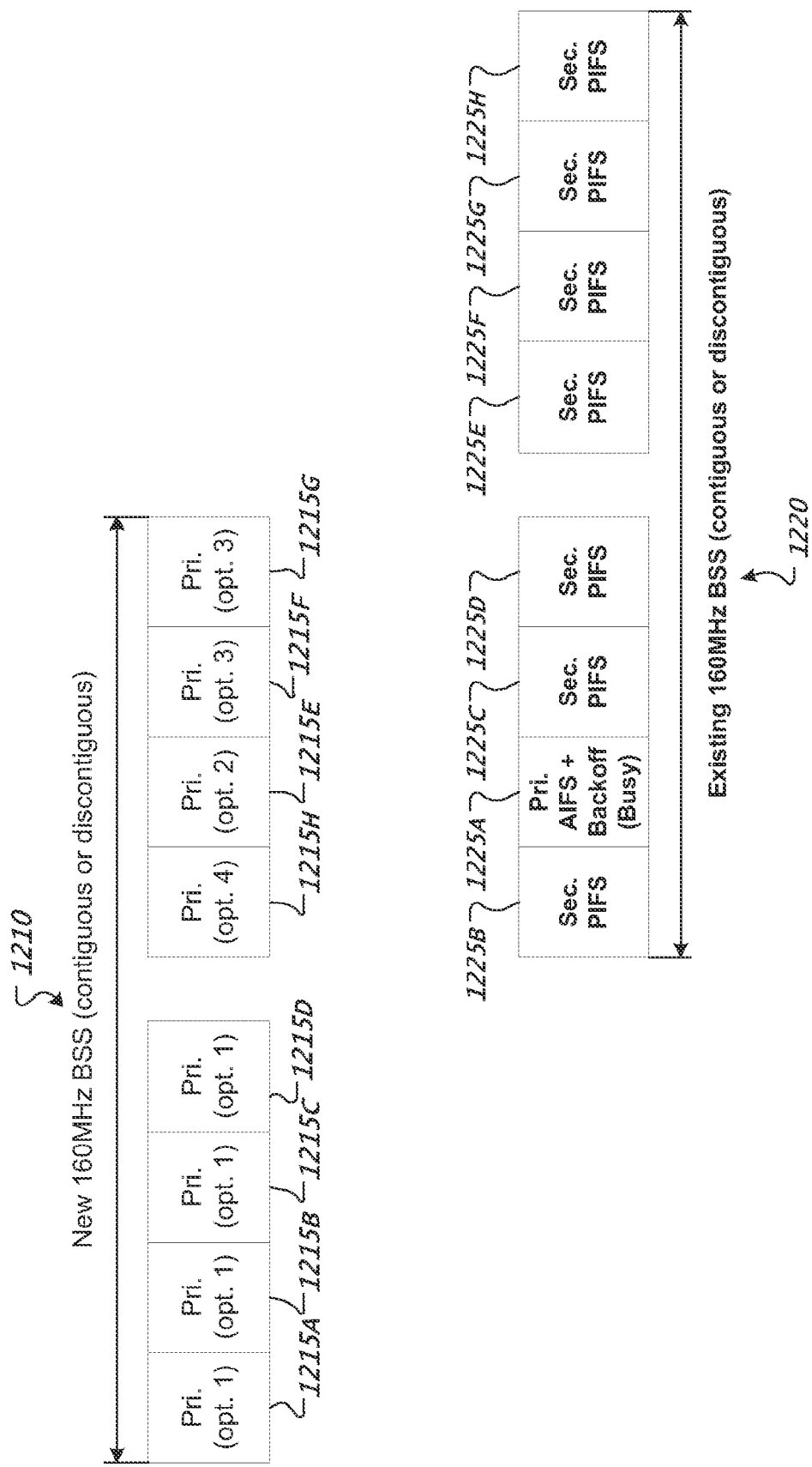
FIG. 12 shows an example of primary channel selection for a new BSS in an eighth BSS coexistence scenario.

FIG. 12 shows an example of primary channel selection for a new BSS in an eighth BSS coexistence scenario There is an existing BSS 1220 (e.g., an IEEE 802.11ac based BSS) that uses a 160 MHz frequency band. The existing BSS 1220 is provided by an existing device. There is also a new BSS 1210 (e.g., an IEEE 802.11ac based BSS) 1210 that uses a 160 MHz frequency band. The frequency bands occupied by the new 160 MHz BSS 1210 and the existing 160 MHz BBS 1220 can include two contiguous portions of 80 MHz bands, or two discontiguous portions of 80 MHz bands. The 80 MHz frequency band portion 1215E-H of the new BSS 1210 overlaps with the 80 MHz frequency band portion 1225A-D of the existing BSS 1220. The existing 160 MHz BSS 1220 includes a primary channel 1225A, a S1 secondary channel 1225B, S2 secondary channels 1225C-D, and S3 secondary channels 1225E-H.

The first option shown in FIG. 12 for primary channel selection for the new BSS 1210 is as follows. The primary channel (channel 1215A, 1215B, 1215C, or 1215D) of the new BSS 1210 can be selected to not overlap with any channels of the existing BSS 1220.

The second option shown in FIG. 12 for primary channel selection for the new BSS 1210 is as follows. The primary channel 1215E can be selected to overlap with the primary channel 1225A of the existing BSS 1220.

The third option shown in FIG. 12 for primary channel selection for the new BSS 1210 is as follows. The primary channel (channel 1215F or channel 1215G) can be selected to partially overlap with the S2 secondary channel 1225C, 1225D of the existing BSS 1220.

The fourth option shown in FIG. 12 for primary channel selection for the new BSS 1210 is as follows. The primary channel 1215H can be selected to overlap with the S1 secondary channel 1225B of the existing BSS 1220.

In some implementations, the traffic load on 1225A is high, the new BSS 1210 can select the primary channel according to the second option. Otherwise, the new BSS 1210 can select the primary channel according to the first option.

Figure 13:
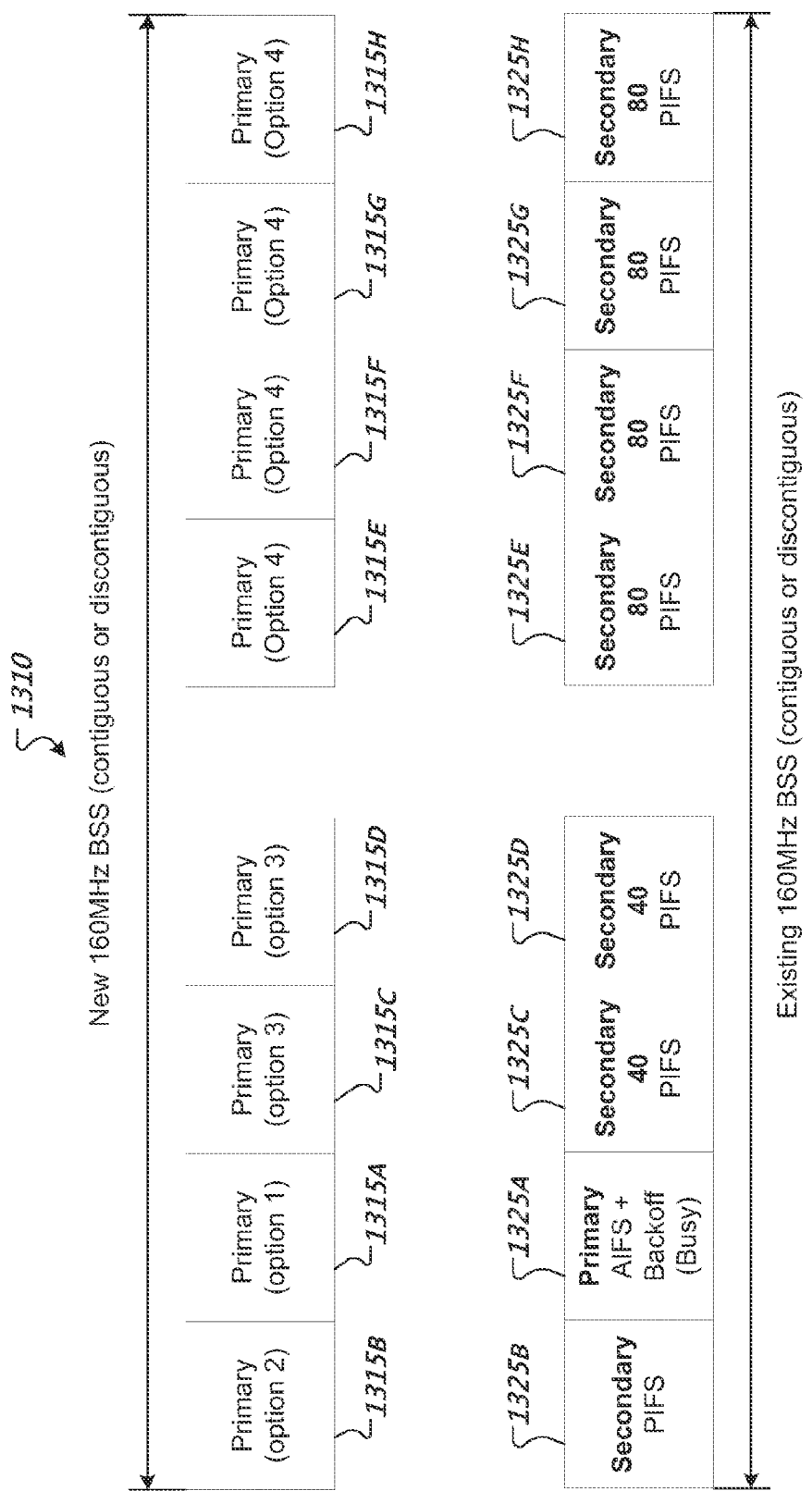
FIG. 13 shows an example of primary channel selection for a new BSS in a ninth BSS coexistence scenario.

FIG. 13 shows an example of primary channel selection for a new BSS in a ninth BSS coexistence scenario. There is an existing BSS 1320 (e.g., an IEEE 802.11ac based BSS) that uses a 160 MHz frequency band. The existing BSS 1320 is provided by an existing device. There is also a new BSS 1310 (e.g., an IEEE 802.11ac based BSS) that uses a 160 MHz frequency band. The new BSS 1310 is provided by a new device. The frequency band occupied by the new 160 MHz BSS 1310 and the existing 160 MHz BBS 1320 overlap with each other. Each of the two frequency bands can include two contiguous portions of 80 MHz bands, or two discontiguous portions of 80 MHz bands. The existing 160 MHz BSS 1320 includes a primary channel 1325A, a S1 secondary channel 1325B, S2 secondary channels 1325C-D, and S3 secondary channels 1325E-H.

The first option shown in FIG. 13 for primary channel selection for the new BSS 1310 is as follows. The primary channel 1315A of the new BSS 1310 can be selected to overlap with the primary channel 1325A of the existing BSS 1320.

The second option shown in FIG. 13 for primary channel selection for the new BSS 1310 is as follows. The primary channel 1315B of the new BSS 1310 can be selected to overlap with S1 1325B of the existing BSS 1320.

The third option shown in FIG. 13 for primary channel selection for the new BSS 1310 is as follows. The primary channel (channel 1315C or channel 1315D) can be selected to partially overlap with either of the S2 secondary channels 1325C, 1325D of the existing BSS 1320.

The fourth option shown in FIG. 13 for primary channel selection for the new BSS 1310 is as follows. The primary channel (channel 1315E, 1315F, 1315G, or 1315H) can be selected to partially overlap with S3 secondary channels 1325E-H of the existing BSS 1320.

In some implementations, both the new BSS 1310 and the existing BSS 1320 are fully loaded, the new BSS 1310 can select the primary channel according to the fourth option. When at least one 20 MHz channel in S3 1425E-H is lightly loaded the new BSS 1310 can select primary channel according to the first option.

Figure 14:
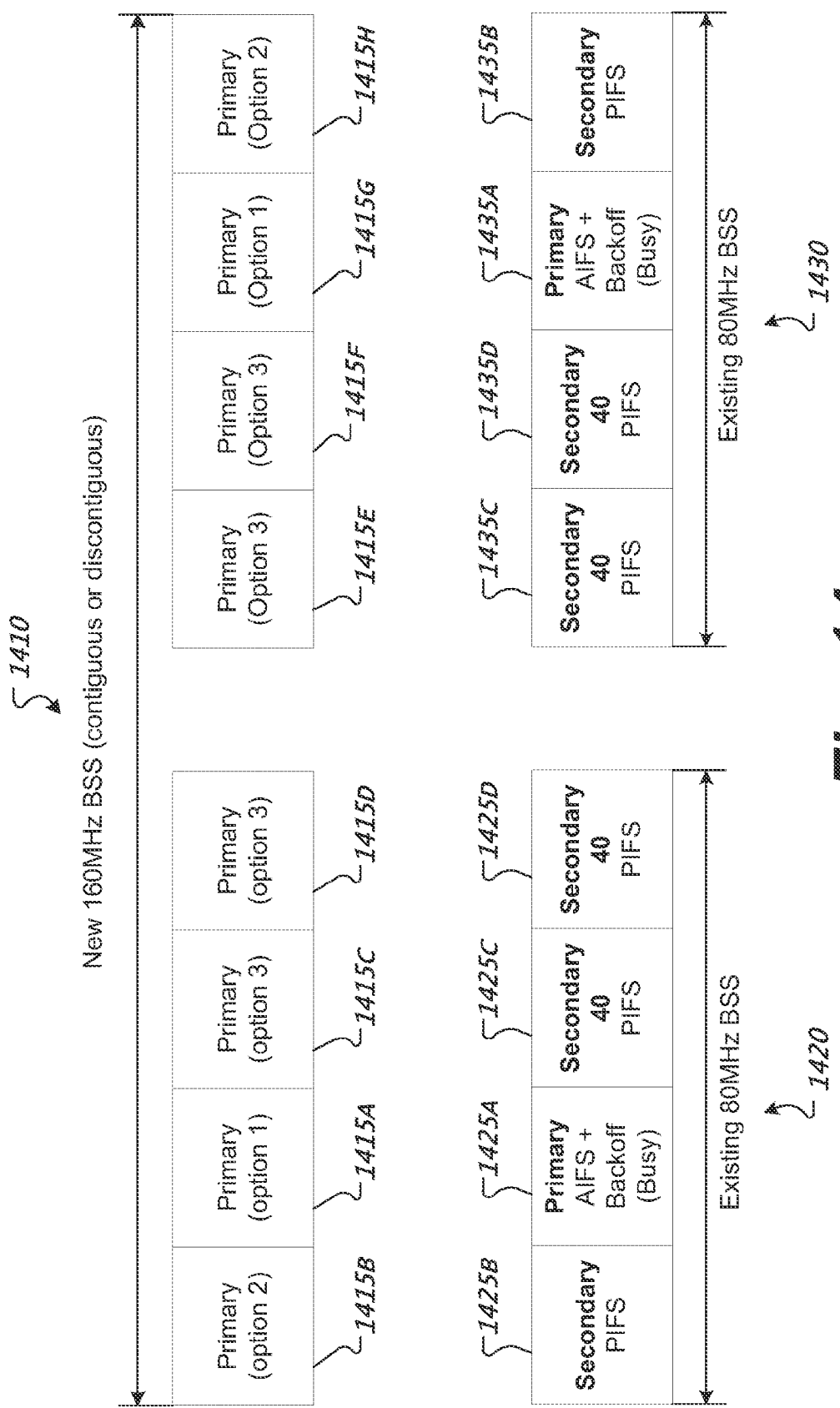
FIG. 14 shows an example of primary channel selection for a new BSS in a tenth BSS coexistence scenario.

FIG. 14 shows an example of primary channel selection for a new BSS in a tenth BSS coexistence scenario. There are two existing BSS's 1420, 1430 (e.g., IEEE 802.11ac based BSS's), each use an 80 MHz frequency band. The two existing BSS's 1420, 1430 are provided by existing devices. There is also a new BSS 1410 (e.g., an IEEE 802.11ac based BSS) that uses a 160 MHz frequency band, The frequency band occupied by the new 160 MHz BSS 1410 can include two contiguous portions of 80 MHz bands, or two discontiguous portions of 80 MHz bands, each of the two 80 MHz bands overlaps with one of the two 80 MHz used by the two existing 80 MHz BSS 1420, 1430. The existing 80 MHz BSS 1420 includes a primary channel 1425A, a S1 1425B, and a S2 1325C-D. The existing 80 MHz BSS 1430 includes a primary channel 1435A, a S1 secondary channel 1435B, and S2 secondary channels 1335C-D.

The first option shown in FIG. 14 for primary channel selection for the new BSS 1410 is as follows. The primary channel (channel 1415A or channel 1415G) of the new BSS 1410 can be selected to overlap with one of the primary channels 1425A, 1435A of the existing BSS's 1420, 1430.

The second option shown in FIG. 14 for primary channel selection for the new BSS 1410 is as follows. The primary channel (1415B or 1415H) of the new BSS 1410 can be selected to overlap with one of the S1's 1425B, 1435B of the existing BSS's 1420, 1430.

The third option shown in FIG. 14 for primary channel selection for the new BSS 1410 is as follows. The primary channel (channel 1415C, 1415D, 1415E, or 1415F) of the new BSS 1410 can be selected to partially overlap with one of the S2 secondary channels 1425C-D, 1435C-D of the existing BSS's 1420, 1430.

In some implementations, the new BSS 1410 can select the primary channel according to the third option when all BSS's are fully loaded. Otherwise, the new BSS 1410 can select the primary channel according to the first option.

Figure 15:
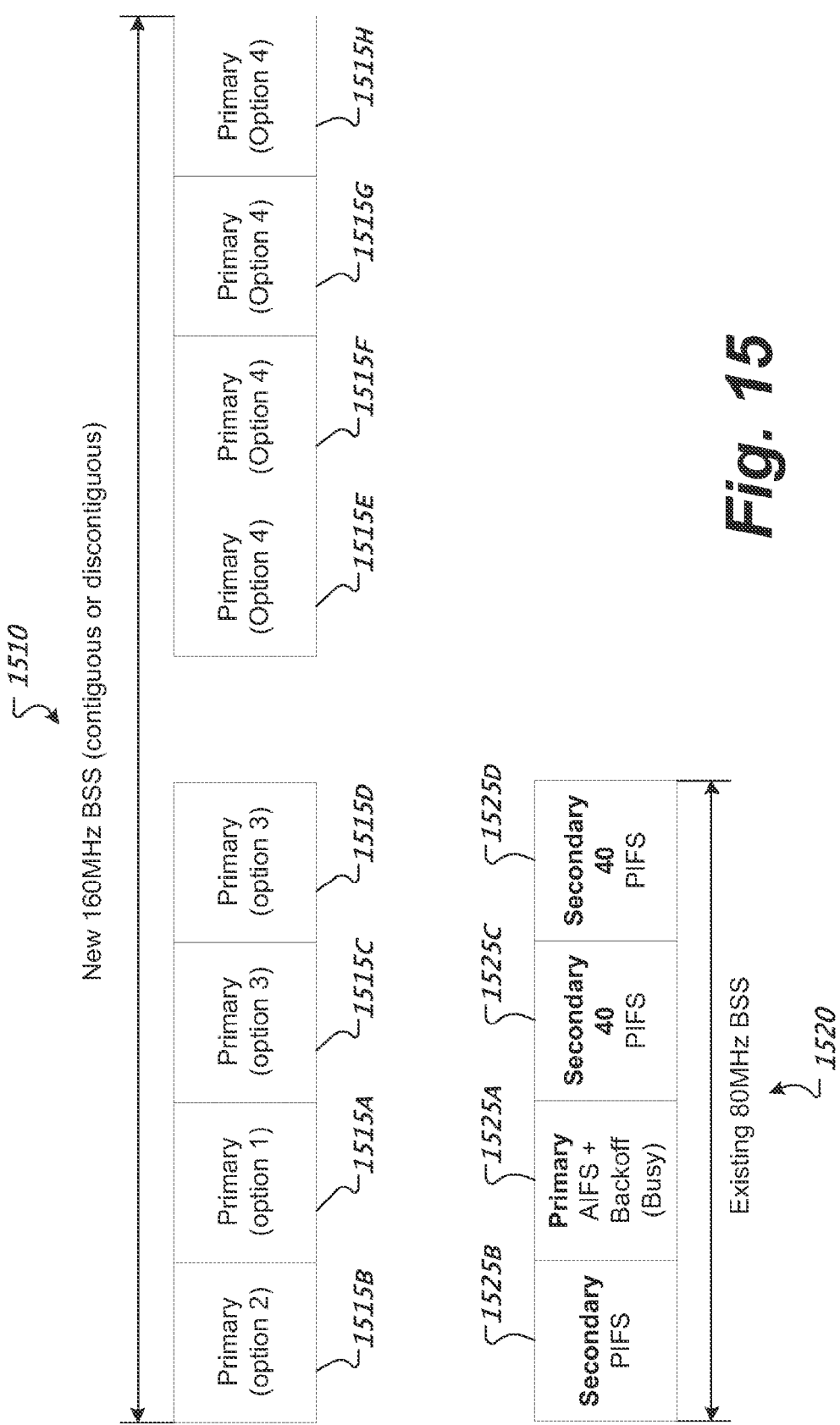
FIG. 15 shows an example of primary channel selection for a new BSS in an eleventh BSS coexistence scenario.

FIG. 15 shows an example of primary channel selection for a new BSS in an eleventh BSS coexistence scenario. There is an existing BSS 1520 (e.g., an IEEE 802.11ac based BSS's) that uses an 80 MHz frequency band. The existing BSS 1520 is provided by an existing device. There is also a new BSS 1510 (e.g., an IEEE 802.11ac based BSS) that uses a 160 MHz frequency band. The frequency band occupied by the new 160 MHz BSS 1510 can include two contiguous portions of 80 MHz bands, or two discontiguous portions of 80 MHz bands. The frequency band occupied by the existing 80 MHz BSS 1520 overlaps with an 80 MHz portion of the 160 MHz occupied by the new BSS 1510. The existing 80 MHz BSS 1520 includes a primary channel 1525A, a S1 secondary channel 1525B, and S2 secondary channels 1525C-D.

The first option shown in FIG. 15 for primary channel selection for the new BSS 1510 is as follows. The primary channel 1515A of the new BSS 1510 can be selected to overlap with the primary channel 1525A of the existing BSS 1520.

The second option shown in FIG. 15 for primary channel selection for the new BSS 1510 is as follows. The primary channel 1515B of the new BSS 1510 can be selected to overlap with the secondary channel 1525B of the existing BSS 1520.

The third option shown in FIG. 15 for primary channel selection for the new BSS 1510 is as follows. The primary channel (1515C or 1515D) of the new BSS 1510 can be selected to partially overlap with the S2 secondary channels 1525C, 1525D of the existing BSS 1520.

The fourth option shown in FIG. 15 for primary channel selection for the new BSS 1510 is as follows. The primary channel (channel 1515E, 1515F, 1515G, or 1515H) of the new BSS 1510 can be selected to not overlap with any channels of the existing BSS 1520.

In some implementations, the existing BSS 1520 is lightly loaded, the new BSS 1510 can select the primary channel according to the fourth option. Otherwise the new BSS 1510 can select the primary channel according to the first option.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

What is claimed is:

1. A method comprising:
    monitoring, at a first wireless communication device, a group of wireless channels for signals from one or more second wireless communication devices;
    identifying, within the group of wireless channels, one or more primary channels on which one or more signals are received from the one or more second wireless communication devices;
    calculating one or more busy-to-idle ratios of the one or more identified primary channels based on one or more channel conditions of the one or more identified primary channels; and
    selecting, from the group of wireless channels, a primary channel for the first wireless communication device based on an estimated traffic load associated with at least a portion of the group of wireless channels, wherein the estimated traffic load is based on the one or more busy-to-idle ratios, and wherein selecting the primary channel for the first wireless communication device comprises:
        using, within the group of wireless channels, a secondary channel as the selected primary channel when the estimated traffic load exceeds a threshold, and
        using at least one of the one or more identified primary channels as the selected primary channel when the estimated traffic load does not exceed the threshold.

2. The method of claim 1, wherein the group of wireless channels comprises two frequency portions, each of the two frequency portions occupying a consecutive frequency band that is one half of an aggregated frequency bandwidth associated with the group of wireless channels.

3. The method of claim 2, wherein the selected primary channel is a frequency portion of the two frequency portions, the frequency portion having a frequency band separate from one or more frequency bands associated with the one or more identified primary channels.

4. The method of claim 1, wherein the one or more signals are received from one second wireless communication device, and wherein the selected primary channel is a primary channel of the one second communication device on which the one or more signals are received.

5. The method of claim 1, wherein at least a subset of the group of wireless channels does not overlap with wireless channels that are usable by the one or more second wireless communication devices, and wherein the selected primary channel is a channel in the at least the subset of the group of wireless channels.

6. The method of claim 1, wherein the one or more second wireless communication devices comprises a device that uses a 20 MHz primary channel, a 20 MHz secondary channel, and a 40 MHz secondary channel, and wherein the selected primary channel is a channel in the 40 MHz secondary channel.

7. The method of claim 1, wherein the one or more second wireless communication devices comprises a device that uses a 20 MHz primary channel, a 20 MHz secondary channel, a 40 MHz secondary channel, and an 80 MHz secondary channel, and wherein the selected primary channel is a channel in the 80 MHz secondary channel.

8. An apparatus, comprising:
    first circuitry configured to monitor a group of wireless channels for signals from one or more wireless communication devices; and
    second circuitry configured to identify, within the group of wireless channels, one or more primary channels on which one or more signals are received from the one or more wireless communication devices, and select, from the group of wireless channels, a primary channel for a wireless communication based on the one or more identified primary channels and an estimated traffic load associated with at least a portion of the group of wireless channels, wherein the selected primary channel is a first channel that is separate from the one or more identified primary channels if the estimated traffic load exceeds a threshold, and wherein the selected primary channel is a second channel from the one or more identified primary channels if the estimated traffic load does not exceed the threshold,
wherein the second circuitry is configured to calculate one or more busy-to-idle ratios of the one or more identified primary channels based on one or more channel conditions of the one or more identified primary channels, and wherein the estimated traffic load is based on the one or more busy-to-idle ratios.

9. The apparatus of claim 8, wherein the second circuitry comprises circuitry configured to measure the one or more channel conditions of the one or more identified primary channels.

10. The apparatus of claim 8, wherein the group of wireless channels comprises two frequency portions, each of the two frequency portions occupying a consecutive frequency band that is one half of an aggregated frequency bandwidth associated with the group of wireless channels.

11. The apparatus of claim 10, wherein the selected primary channel is a frequency portion of the two frequency portions, the frequency portion having a frequency band separate from one or more frequency bands associated with the one or more identified primary channels.

12. The apparatus of claim 8, wherein the one or more signals are received from one wireless communication device, and wherein the selected primary channel is a primary channel of the one wireless communication device on which the one or more signals are received.

13. The apparatus of claim 8, wherein at least a subset of the group of wireless channels does not overlap with wireless channels that are usable by the one or more wireless communication devices, and wherein the selected primary channel is a channel in the at least the subset of the group of wireless channels.

14. The apparatus of claim 8, wherein the one or more wireless communication devices comprises a device that uses a 20 MHz primary channel, a 20 MHz secondary channel, and a 40 MHz secondary channel, and wherein the selected primary channel is a channel in the 40 MHz secondary channel.

15. The apparatus of claim 8, wherein the one or more wireless communication devices comprises a device that uses a 20 MHz primary channel, a 20 MHz secondary channel, a 40 MHz secondary channel, and an 80 MHz secondary channel, and wherein the selected primary channel is a channel in the 80 MHz secondary channel.

16. A system comprising:
transceiver electronics; and
processor electronics coupled with the transceiver electronics, configured to perform operations comprising:
monitoring a group of wireless channels for signals from one or more wireless communication devices;
identifying, within the group of wireless channels, one or more primary channels on which one or more signals are received from the one or more wireless communication devices;
calculating one or more busy-to-idle ratios of the one or more identified primary channels based on one or more channel conditions of the one or more identified primary channels; and
selecting, from the group of wireless channels, a primary channel for a wireless communication based on an estimated traffic load associated with at least a portion of the group of wireless channels, wherein the estimated traffic load is based on the one or more busy-to-idle ratios, and wherein selecting the primary channel for the wireless communication comprises using, within the group of wireless channels, a secondary channel as the selected primary channel when the estimated traffic load exceeds a threshold, and using at least one of the one or more identified primary channels as the selected primary channel when the estimated traffic load does not exceed the threshold.

17. The system of claim 16, wherein the group of wireless channels comprises two frequency portions, each of the two frequency portions occupying a consecutive frequency band that is one half of an aggregated frequency bandwidth associated with the group of wireless channels.

18. The system of claim 17, wherein the selected primary channel is a frequency portion of the two frequency portions, the frequency portion having a frequency band separate from one or more frequency bands associated with the one or more identified primary channels.

19. The system of claim 16, wherein the one or more signals are received from one wireless communication device, and wherein the selected primary channel is a primary channel of the one wireless communication device on which the one or more signals are received.

20. The system of claim 16, wherein at least a subset of the group of wireless channels does not overlap with wireless channels that are usable by the one or more wireless communication devices, and wherein the selected primary channel is a channel in the at least the subset of the group of wireless channels.

21. The system of claim 16, wherein the one or more wireless communication devices comprises a device that uses a 20 MHz primary channel, a 20 MHz secondary channel, and a 40 MHz secondary channel, and wherein the selected primary channel is a channel in the 40 MHz secondary channel.

22. The system of claim 16, wherein the one or more wireless communication devices comprises a device that uses a 20 MHz primary channel, a 20 MHz secondary channel, a 40 MHz secondary channel, and an 80 MHz secondary channel, and wherein the selected primary channel is a channel in the 80 MHz secondary channel.

* * * * *